(12) United States Patent
Kusafuka et al.

(10) Patent No.: US 11,442,269 B2
(45) Date of Patent: Sep. 13, 2022

(54) 3D DISPLAY DEVICE, HEAD-UP DISPLAY, MOVING BODY, AND PROGRAM

(71) Applicant: KYOCERA Corporation, Kyoto (JP)

(72) Inventors: Kaoru Kusafuka, Tokyo (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/284,945

(22) PCT Filed: Oct. 28, 2019

(86) PCT No.: PCT/JP2019/042125
§ 371 (c)(1),
(2) Date: Apr. 13, 2021

(87) PCT Pub. No.: WO2020/090712
PCT Pub. Date: May 7, 2020

(65) Prior Publication Data
US 2021/0356740 A1 Nov. 18, 2021

(30) Foreign Application Priority Data

Nov. 2, 2018 (JP) .............................. JP2018-207539

(51) Int. Cl.
*H04N 13/376* (2018.01)
*B60K 35/00* (2006.01)
*G02B 27/01* (2006.01)
*H04N 13/31* (2018.01)
(Continued)

(52) U.S. Cl.
CPC .......... *G02B 27/0101* (2013.01); *B60K 35/00* (2013.01); *G02B 30/27* (2020.01);
(Continued)

(58) Field of Classification Search
CPC .... G02B 27/0101; G02B 30/27; G02B 30/30; G02B 2027/0134; G02B 2027/014; G02B 27/01; G02B 30/00; B60K 35/00; B60K 2370/1529; B60K 2370/29; B60K 2370/149; B60K 2370/1531; B60K 2370/334; H04N 13/31; H04N 13/363;
(Continued)

(56) References Cited

U.S. PATENT DOCUMENTS 5,883,739 A 3/1999 Ashihara et al.
6,970,290 B1 11/2005 Mashitani et al.
(Continued)

FOREIGN PATENT DOCUMENTS

JP 2001-166259 A 6/2001
JP 2011-244465 A 12/2011
WO 2014/093100 A1 6/2014

*Primary Examiner* — Tung T Vo
(74) *Attorney, Agent, or Firm* — Studebaker & Brackett PC

(57) ABSTRACT

A 3D display device includes a display panel, an optical element, a second communication module, and a controller. The display panel is mounted on a moving body and configured to display a parallax image. The optical element is configured to define a propagation direction of image light emitted from the display panel. The second communication module is configured to receive a motion signal indicating a parameter of a motion of the moving body. The controller is configured to cause the display panel to display the parallax image based on the parameter indicated by the motion signal.

9 Claims, 14 Drawing Sheets

(51) Int. Cl.
*H04N 13/363* (2018.01)
*H04N 13/38* (2018.01)
*H04N 13/398* (2018.01)
*G02B 30/30* (2020.01)
*G02B 30/27* (2020.01)

(52) U.S. Cl.
CPC .............. *G02B 30/30* (2020.01); *H04N 13/31* (2018.05); *H04N 13/363* (2018.05); *H04N 13/376* (2018.05); *H04N 13/38* (2018.05); *H04N 13/398* (2018.05); *B60K 2370/1529* (2019.05); *B60K 2370/29* (2019.05); *G02B 2027/014* (2013.01); *G02B 2027/0134* (2013.01)

(58) Field of Classification Search
CPC .... H04N 13/376; H04N 13/38; H04N 13/398; H04N 13/373; H04N 5/232; H04N 13/378; G02F 1/13
USPC .......................................................... 348/54
See application file for complete search history.

(56) References Cited

U.S. PATENT DOCUMENTS

| | | | |
|---|---|---|---|
| 9,690,098 B1* | 6/2017 | Kuo | G02B 27/0149 |
| 9,726,886 B1* | 8/2017 | Kuo | B60K 35/00 |
| 10,254,551 B2* | 4/2019 | Kishigami | G02B 27/0101 |
| 2013/0201303 A1 | 8/2013 | Shimotani et al. | |
| 2015/0226965 A1* | 8/2015 | Kim | G02B 30/30 359/463 |
| 2016/0170487 A1* | 6/2016 | Saisho | G01C 21/3632 345/156 |
| 2016/0313562 A1* | 10/2016 | Saisho | G02B 27/0101 |
| 2018/0239152 A1* | 8/2018 | Kuo | G02B 27/0149 |
| 2020/0386806 A1* | 12/2020 | Ochiai | H01L 21/822 |
| 2021/0055547 A1* | 2/2021 | Rao | G09G 3/3208 |
| 2021/0055548 A1* | 2/2021 | Rao | G06F 3/1423 |
| 2021/0070176 A1* | 3/2021 | Rao | G02B 30/29 |
| 2021/0107357 A1* | 4/2021 | Yu | G02B 27/01 |
| 2021/0132377 A1* | 5/2021 | Rao | G06F 3/1423 |
| 2021/0152812 A1* | 5/2021 | Ota | G02B 27/0101 |

* cited by examiner

SITTING SURFACE

SITTING SURFACE

3D DISPLAY DEVICE, HEAD-UP DISPLAY, MOVING BODY, AND PROGRAM

CROSS-REFERENCE TO RELATED APPLICATION

This application claims priority to Japanese Patent Application No. 2018-207539, which was filed on Nov. 2, 2018, the contents of which are incorporated herein by reference in its entirety.

TECHNICAL FIELD

The present disclosure relates to a 3D display device, a head up display, a moving body, and a program.

BACKGROUND ART

In the related art, a 3D display device including an optical element that causes part of light emitted from a display panel to arrive at the right eye and causes other part of the light emitted from the display panel to arrive at the left eye to perform 3D display without using glasses has been known (see Patent Literature 1).

CITATION LIST

Patent Literature

Patent Literature 1: Japanese Unexamined Patent Publication JP-A 2001-166259

SUMMARY OF INVENTION

A 3D display device according to the disclosure includes a display panel, an optical element, a communication module, and a controller. The display panel is mounted on a moving body and configured to display a parallax image. The optical element is configured to define a propagation direction of image light emitted from the display panel. The communication module is configured to receive a motion signal indicating a parameter of a motion of the moving body. The controller is configured to cause the display panel to display the parallax image based on the parameter indicated by the motion signal.

A head-up display according to the disclosure includes a 3D display device and an optical member. The 3D display device includes a display panel, an optical element, a communication module, and a controller. The display panel is mounted on a moving body and configured to display a parallax image. The optical element is configured to define a propagation direction of image light emitted from the display panel. The communication module is configured to receive a motion signal indicating a parameter of a motion of the moving body. The controller is configured to cause the display panel to display the parallax image based on the parameter indicated by the motion signal. The optical member is configured to reflect the image light emitted from the 3D display device and cause the reflected light to reach eyes of a user.

A moving body according to the disclosure includes a head-up display. The head-up display includes a 3D display device and an optical member. The 3D display device includes a display panel, an optical element, a communication module, and a controller. The display panel is configured to display a parallax image. The optical element is configured to define a propagation direction of image light emitted from the display panel. The communication module is configured to receive a motion signal indicating a parameter of a motion of the moving body. The controller is configured to cause the display panel to display the parallax image based on the parameter indicated by the motion signal. The optical member is configured to reflect the image light emitted from the 3D display device and cause the reflected light to reach eyes of a user.

A program according to the disclosure is a program of activating a 3D display device mounted on a moving body. The 3D display device includes a display panel, an optical element, a communication module, and a controller. The optical element defines a propagation direction of image light emitted from the display panel. The controller causes the communication module to receive a motion signal indicating a parameter of a motion of the moving body. The controller causes the display panel to display a parallax image based on the parameter.

DETAILED DESCRIPTION

It is preferable that image light arrives at both eyes of a user appropriately and the user appropriately views a 3D image displayed on a 3D display device and a virtual image of the 3D image.

The disclosure provides a 3D display device, a head-up display system, a communication device, a moving body, and a program capable of causing a user to view a 3D image or a virtual image of the 3D image appropriately.

Hereinafter, an embodiment of the disclosure will be described with reference to the drawings. The drawings used for the following description are schematic and dimensional ratios or the like on the drawings do not necessarily match the actual dimensional ratios or the like.

Figure 1:
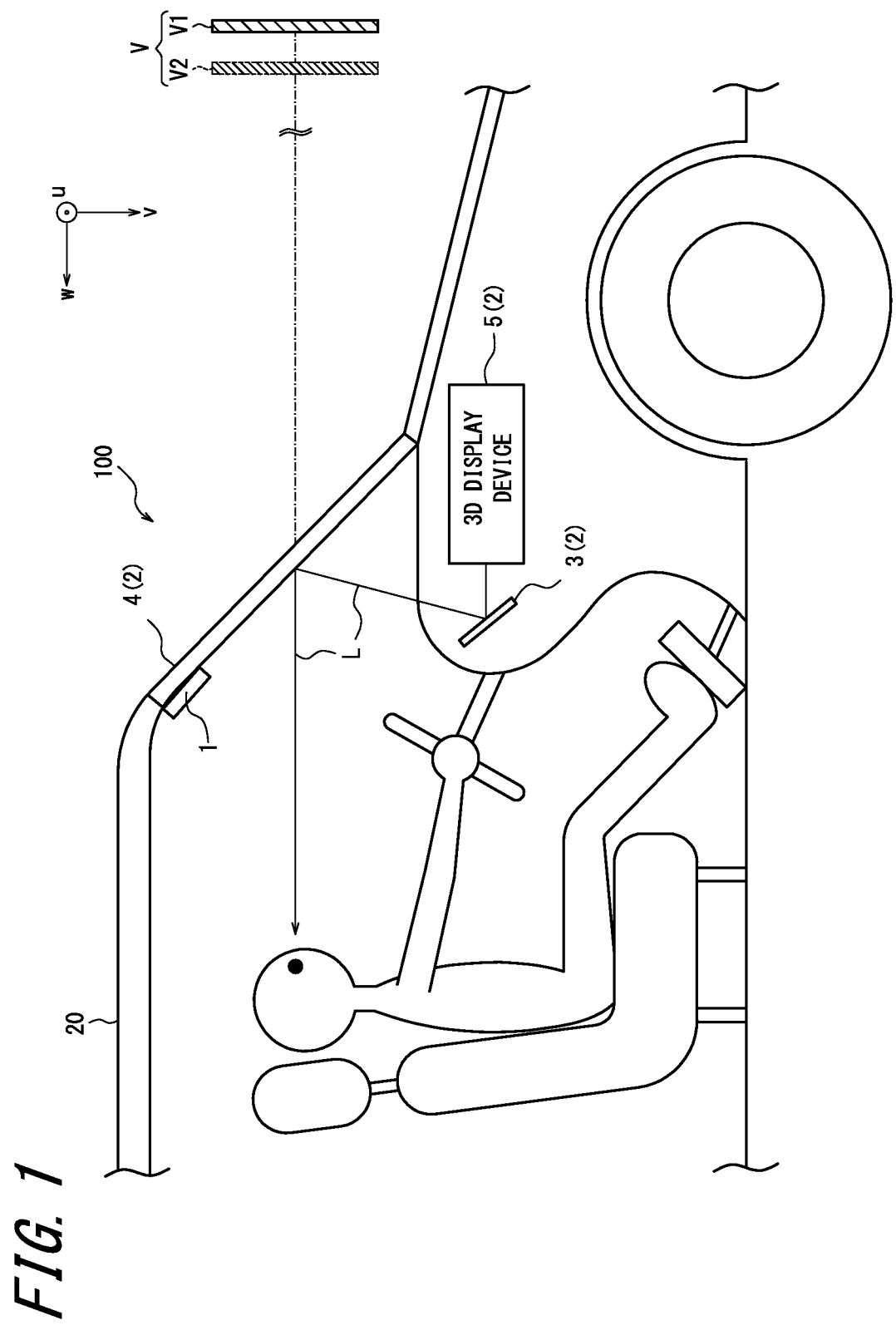
FIG. 1 is a diagram illustrating an example of a communication head-up display system mounted on a moving body.

As illustrated in FIG. 1, a communication head-up display (HUD) system 100 according to the embodiment may be mounted on a moving body 20.

In the disclosure, examples of the "moving body" include vehicles, ships, and airplanes. In the disclosure, examples of "vehicles" include automobiles and industrial vehicles, but the disclosure is not limited thereto. The examples of "vehicles" may include railway vehicles, daily life vehicles, and fixed-wing aircrafts taxiing on the ground. Examples of automobiles include passenger cars, trucks, buses, two-wheeled vehicles, and trolley buses, but the disclosure is not limited thereto. Examples of automobiles include other vehicles traveling on roads. Examples of the industrial vehicles include industrial vehicles for agriculture and construction. Examples of the industrial vehicles include forklifts and golf carts, but the disclosure is not limited thereto. Examples of the industrial vehicles for agriculture include tractors, tillers, transplanters, binders, combine harvesters, lawn mowers, but the disclosure is not limited thereto. Examples of the industrial vehicles for construction include bulldozers, scrapers, shovel cars, crane trucks, dump cars, and road rollers, but the disclosure is not limited thereto. Examples of vehicles include things traveling with manpower. The classification of the vehicles is not limited to the above-described vehicles. For example, the automobiles may include industrial vehicles which can travel on roads or may include the same vehicles classified into a plurality of classes. Examples of the ships in the disclosure include marine jets, boats, and tankers. Examples of the airplanes include fixed-wing aircrafts and rotary-wing aircrafts.

The communication HUD system 100 can include an imaging device 1 and a head-up display (HUD) 2.

The imaging device 1 is disposed so that a face of a user is contained in an imaging range. When the communication HUD system 100 is mounted on the moving body 20, the imaging device 1 may be mounted on a rearview mirror. The imaging device 1 may be mounted on, for example, a cluster in an instrument panel. The imaging device 1 may be mounted on a center panel. The imaging device 1 may be mounted on a support portion of a steering wheel.

Figure 2:
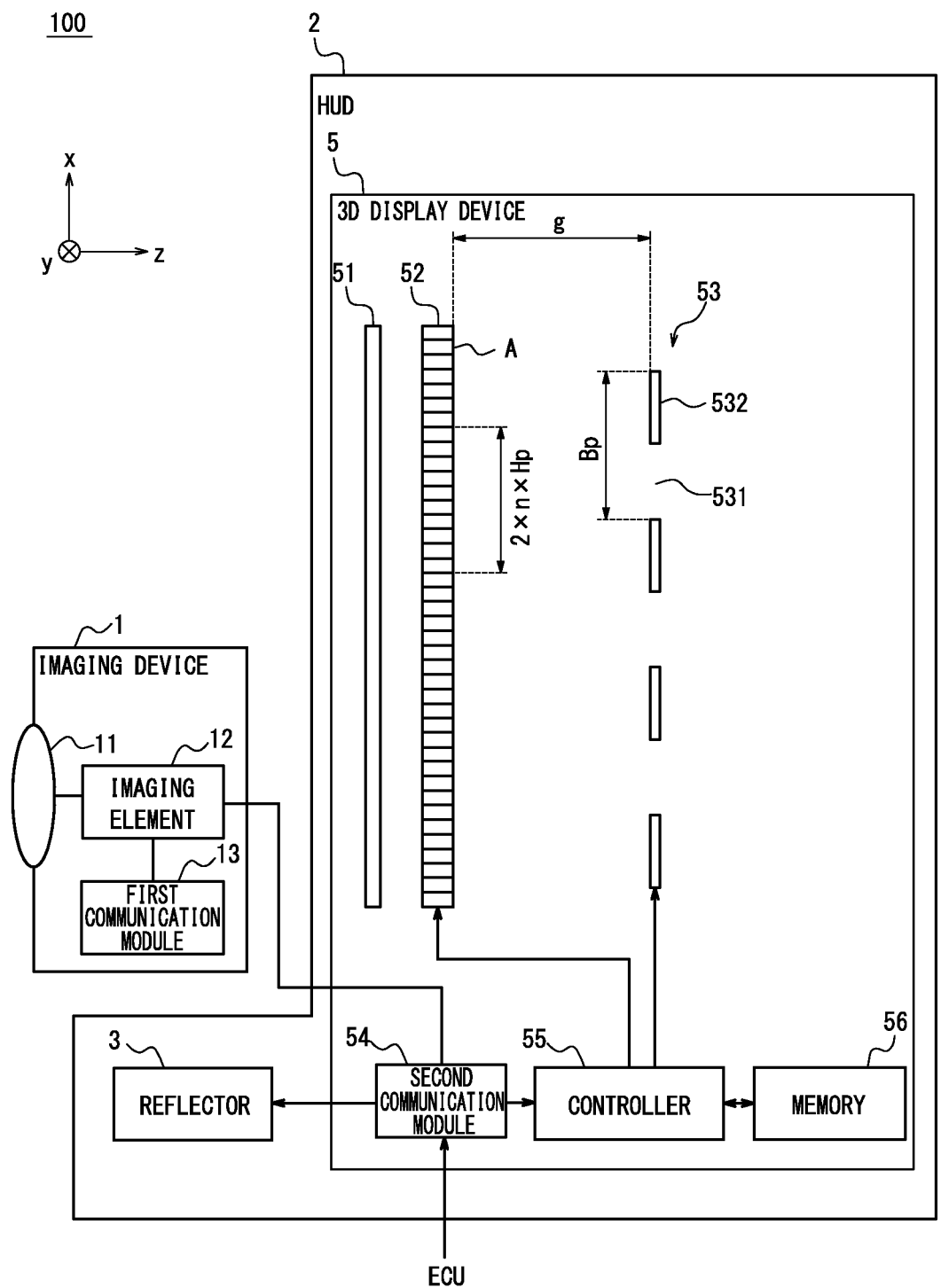
FIG. 2 is a diagram illustrating an overall configuration of the communication head-up display system illustrated in FIG. 1.

As illustrated in FIG. 2, the imaging device 1 includes an imaging optical system 11, an imaging element 12, and a first communication module 13.

The imaging optical system 11 is configured to include one or more lenses. The imaging optical system 11 is disposed so that an optical axis is perpendicular to an imaging surface of the imaging element 12. The imaging optical system 11 is configured to form an image of light incident from a subject as a subject image on the imaging element 12.

The imaging element 12 may include, for example, a CCD (Charged Coupled Device) imaging element or a CMOS (Complementary Metal Oxide Semiconductor) imaging element. The imaging element 12 is configured to generate a captured image by converting an image formed by the imaging optical system 11.

The first communication module 13 is configured to be able to communicate with the HUD 2. For example, the first communication module 13 transmits the captured image generated by the imaging element 12 to the HUD 2. A communication scheme used for communication between the first communication module 13 and the HUD 2 may be a short-range wireless communication standard or a wireless communication standard connected to a mobile phone network or may be a wired communication standard. Examples of the short-range wireless communication standard may include WiFi (registered trademark), Bluetooth (registered trademark), infrared ray, and NFC (Near Field Communication). Examples of the wireless communication standard connected to a mobile phone network may include LTD (Long Term Evolution), a fourth generation mobile communication system, or a fifth generation mobile communication system.

As illustrated in FIG. 1, the HUD 2 can include a reflector 3, an optical member 4, and a 3D display device 5.

The reflector 3 is configured to reflect image light emitted from the 3D display device 5, toward a predetermined region of the optical member 4. The predetermined region is a region in which the image light reflected from the predetermined region heads for the eyes of the user. The predetermined region can be determined in accordance with the direction of the eyes of the user to the optical member 4 and a direction of incidence of the image light to the optical member 4. The reflector 3 includes one or more reflection elements.

Each reflection element may be a mirror. When the reflection element is a mirror, the mirror may be, for example, a concave mirror. In FIG. 1, the reflector 3 is displayed as one mirror. However, the disclosure is not limited thereto and the reflector 3 may be configured by one or more mirrors.

The optical member 4 is configured to reflect the image light which is emitted from the 3D display device 5 and reflected from the reflector 3 toward the left eye (a first eye) and the right eye (a second eye) of the user. For example, a windshield of the moving body 20 may also serve as the optical member 4. Accordingly, the HUD 2 is configured so that the light emitted from the 3D display device 5 travels to the left eye and the right eye of the user along an optical path L. The user can view light arriving along the optical path L as a virtual image V.

As illustrated in FIG. 2, the 3D display device 5 can include an irradiator 51, a display panel 52, a parallax barrier 53 serving as an optical element, a second communication module 54, a controller 55, and a memory 56. In the configuration in which the HUD 2 is mounted on the moving body 20, the 3D display device 5 may be stored in a dashboard of the moving body 20.

The irradiator 51 can planarly irradiate the display panel 52. The irradiator 51 may include a light source, a light-guiding plate, a diffusion plate, and a diffusion sheet. The irradiator 51 is configured to emit irradiation light from the light source and homogenize the irradiation light in a planar direction of the display panel 52 by the light-guiding plate, the diffusion plate, the diffusion sheet, or the like. The irradiator 51 can be configured to emit the homogenized light to the side of the display panel 52.

As the display panel 52, for example, a display panel such as a transmissive liquid crystal display panel can be adopted.

The display panel 52 is not limited to a transmissive liquid crystal display panel and another display panel such as an organic EL can be used. When a self-luminous display panel is used as the display panel 52, the 3D display device 5 may not include the irradiator 51. The display panel 52 will be described as a liquid crystal panel.

Figure 3:
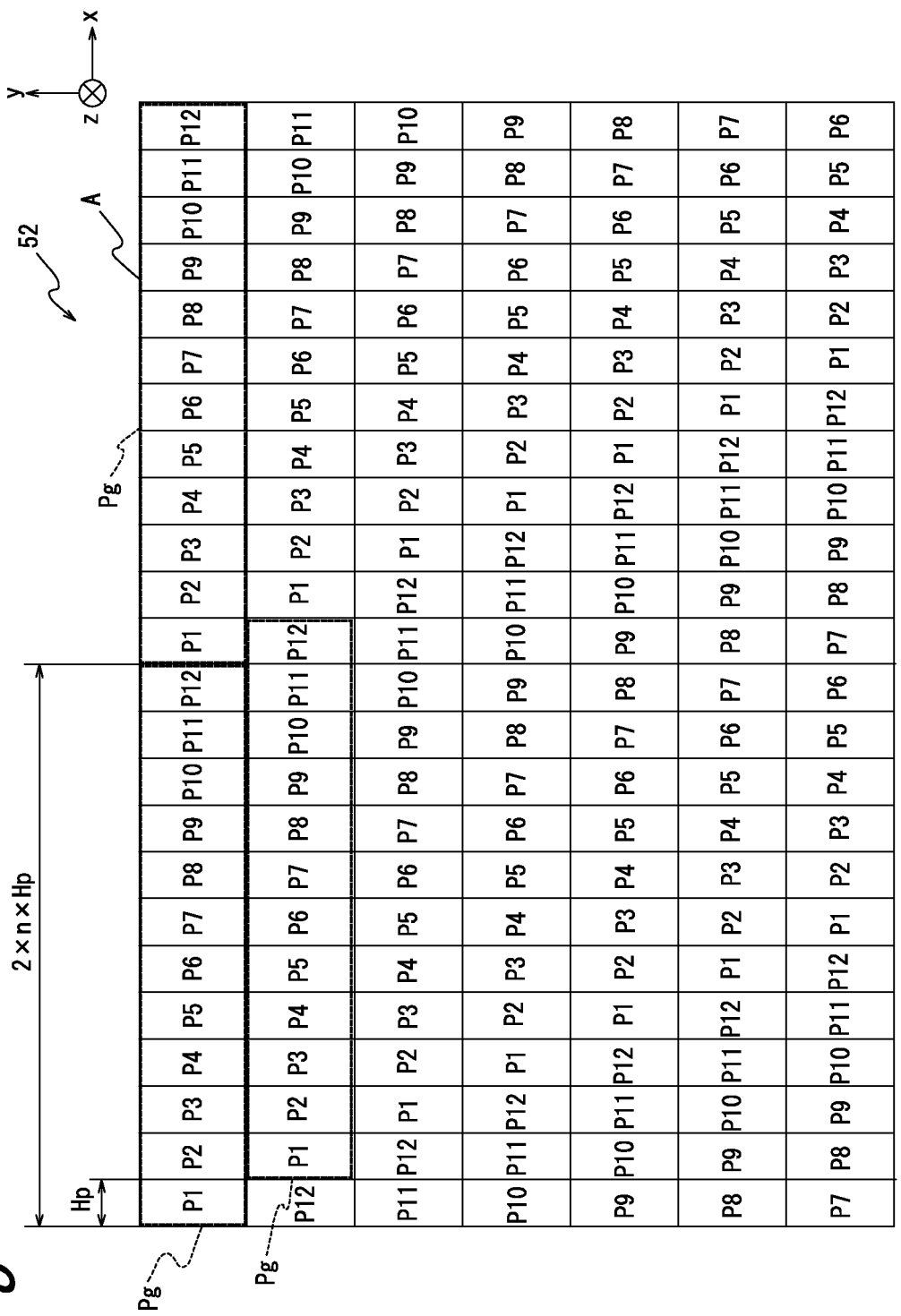
FIG. 3 is a diagram illustrating an example in which a display panel illustrated in FIG. 2 is viewed in a depth direction.

As illustrated in FIG. 3, the display panel 52 includes a plurality of divided regions on an active area A formed in a planar shape. The active area A is configured to display a parallax image. The parallax image includes a left-eye image (a first image) and a right-eye image (a second image) that has a parallax with respect to the left-eye image, as will be described below. The divided regions are regions divided in a first direction and a second direction perpendicular to the first direction. A direction perpendicular to the first and second directions is referred to as a third direction. The first direction may also be referred to as a horizontal direction. The second direction may also be referred to as a vertical direction. The third direction may also be referred to as a depth direction. However, the first, second, and third directions are not limited thereto. In FIGS. 2 to 4, 13, and 14, the first direction is represented as an x axis direction, the second direction is represented as a y axis direction, and the third direction is represented as a z axis direction. In FIGS. 1 and 5 to 10, an inter-eye direction which is a direction in which a straight line passing through the left and right eyes of the user is oriented is represented as a u axis direction, an anteroposterior direction of the user is represented as a v axis direction, and a height direction perpendicular to the u axis direction and the v axis direction is represented as a w axis direction.

Each of the divided regions corresponds to one subpixel. Accordingly, the active area A includes a plurality of subpixels arranged in a lattice form in the horizontal and vertical directions.

Each subpixel corresponds to one of red (R), green (G), and blue (B) and a set of three R, G, and B subpixels can constitute one pixel. One pixel can be referred to as one pixel element. The display panel 52 is not limited to the transmissive liquid crystal panel and another display panel such as an organic EL can be used. When a self-luminous display panel is displayed as the display panel 52, the 3D display device 5 may not include the irradiator 51.

The plurality of subpixels arranged in the active area A constitute a subpixel group Pg. The subpixel groups Pg are repeatedly arranged in the horizontal direction. The subpixel groups Pg can be arranged at the same position in the vertical direction and can be arranged to be shifted. For example, the subpixel groups Pg can be repeatedly arranged in the vertical direction to be adjacent to positions shifted by one subpixel in the horizontal direction. The subpixel group Pg includes subpixels in predetermined rows and columns. For example, the subpixel group Pg includes (2×n×b) subpixels P1 to P(2×n×b) in which b subpixels (b rows) in the vertical direction and 2×n (2×n columns) subpixels in the horizontal direction are continuously arranged. In the example illustrated in FIG. 3, n=6 and b=1. In the active area A, the subpixel group Pg including twelve subpixels P1 to P12 in which one subpixel in the vertical direction and twelve subpixels in the horizontal direction are continuously arranged is disposed. In the example illustrated in FIG. 3, reference numerals are given to some subpixel group Pg.

The subpixel group Pg is a minimum unit in which the controller 55 described below performs control to display an image. The subpixels included in the subpixel group Pg are identified with identification information P1 to P(2×n×b). The subpixels P1 to P(2×n×b) that have the same identification information of the whole subpixel group Pg can be controlled substantially simultaneously by the controller 55. For example, when an image displayed at the subpixel P1 is switched from a left-eye image to a right-eye image, the controller 55 simultaneously switches the image displayed at the subpixel P1 in the whole subpixel group Pg from the left-eye image to the right-eye image.

As illustrated in FIG. 2, the parallax barrier 53 can be formed in a planar shape along the active area A. The parallax barrier 53 is disposed away by a predetermined distance from the active area A. The parallax barrier 53 may be positioned on an opposite side of the irradiator 51 with respect to the display panel 52. The parallax barrier 53 may be positioned on the irradiator 51-side with respect to the display panel 52.

Figure 4:
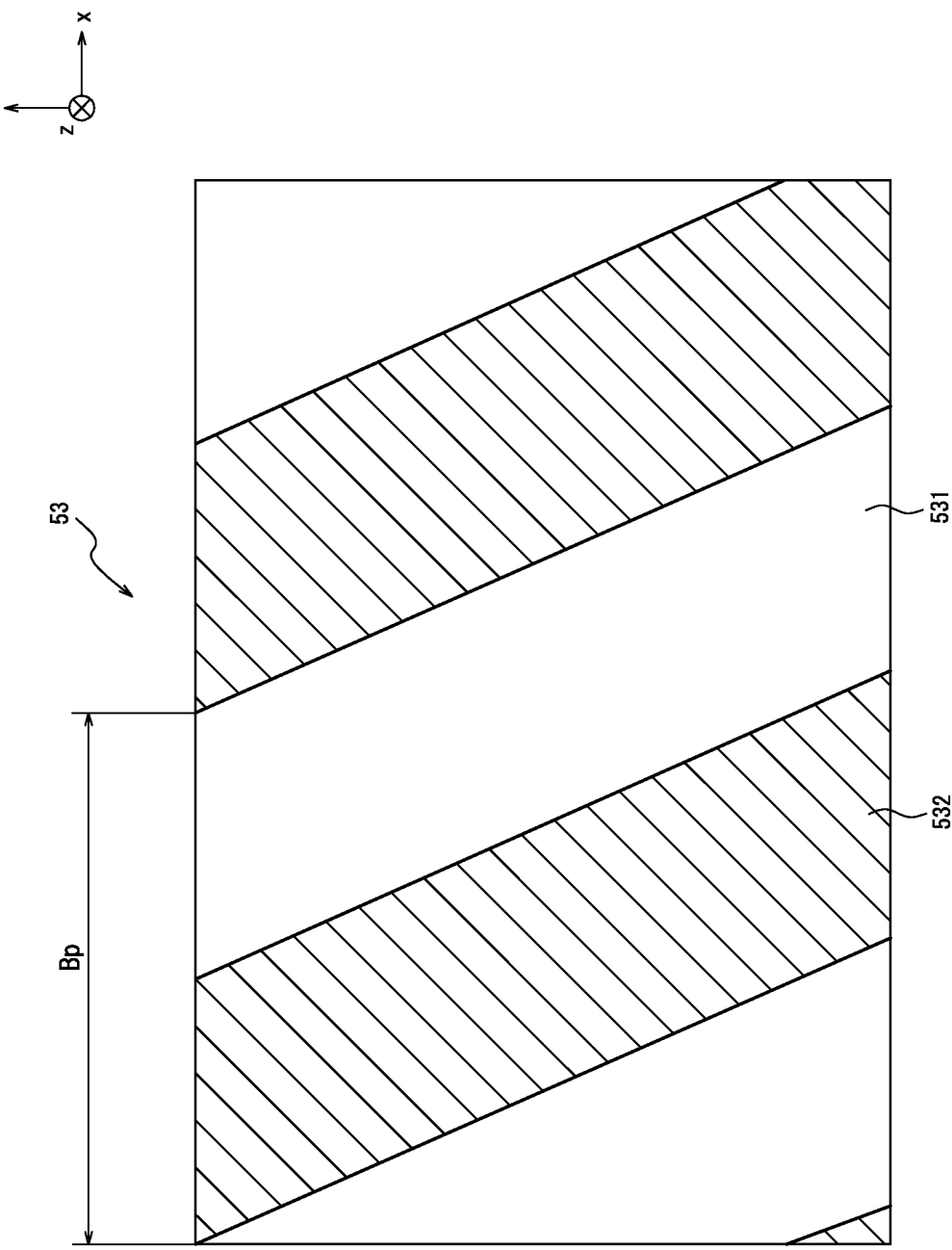
FIG. 4 is a diagram illustrating an example in which a parallax barrier illustrated in FIG. 2 is viewed in the depth direction.

As illustrated in FIG. 4, the parallax barrier 53 is configured to define a propagation direction of the image light emitted from the subpixels for each of light-transmitting regions 531 which are a plurality of strip regions extending in a predetermined direction in the plane. For example, the parallax barrier 53 includes a plurality of dimming regions 532 in which the image light is dimmed. The plurality of dimming regions 532 partition the light-transmitting regions 531 between the adjacent dimming regions 532. The light-transmitting region 531 has higher light transmittance than the dimming region 532. The dimming region 532 has lower light transmittance than the light-transmitting region 531. The light-transmitting region 531 and the dimming region 532 extend in a predetermined direction along the active area A and are alternately arranged repeatedly in a direction perpendicular to the predetermined direction. The predetermined direction is, for example, a direction along a diagonal line of the subpixels, for example. The predetermined direction can be set to a direction which crosses b subpixels in the second direction while crossing a subpixels in the first direction (where a and b are positive relative prime integers). The predetermined direction may be the second direction.

The parallax barrier 53 defines a propagation direction of the image light emitted from the subpixels arranged in the active area A. Thus, the image light emitted from the subpixels of a part of the active area A transmits through the light-transmitting region 531 and is propagated to the left eye of the user via the reflector 3 and the optical member 4. The parallax barrier 53 defines the propagation direction of the image light emitted from the subpixels of another part. Thus, the image light emitted from the subpixels of a part of the active area A transmits through the light-transmitting region 531 and is propagated to the right eye of the user via the reflector 3 and the optical member 4.

Figure 5:
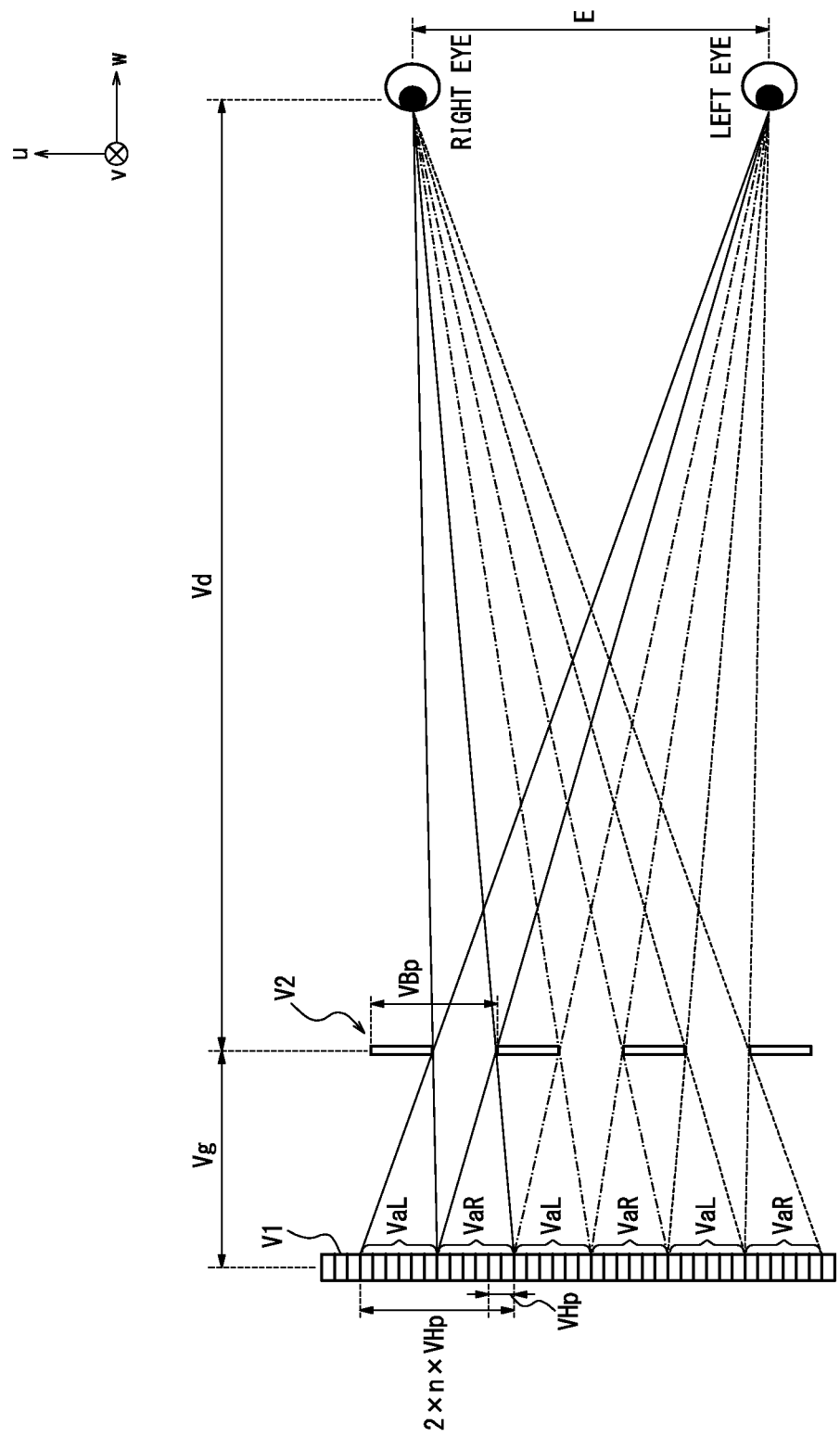
FIG. 5 is a diagram illustrating a relation between a virtual image and eyes of a user, as illustrated in FIG. 1.

As illustrated in FIG. 5, a region in a first virtual image V1 which is a virtual image of the active area A and can be viewed by each eye of the user is determined. Hereinafter, a region in the first virtual image V1 which can be viewed by the left eye with the image light propagated to the position of the left eye of the user is referred to as a left visible region VaL (a first visible region). A region in the first virtual image V1 which can be viewed by the right eye with the image light propagated to the position of the right eye of the user is referred to as a right visible region VaR (a second visible region).

The user recognizes an image just as the user views the first virtual image V1 via a second virtual image V2 which is a virtual image of the parallax barrier 53.

The second communication module 54 is configured to be able to communicate with an ECU (Engine Control Unit or Electric Control Unit) of the moving body 20. The second communication module 54 may communicate with the ECU via a network inside a vehicle, such as a CAN (Controller Area Network) (registered trademark), a LIN (Local Interconnect Network), or an in-vehicle Ethernet (registered trademark). The second communication module 54 may receive a motion signal from the ECU. The motion signal is a signal indicating a parameter that represents a motion of the moving body 20. The parameter of the motion includes at least one of acceleration and angular acceleration.

The second communication module 54 is configured to be able to communicate with the first communication module 13 of the imaging device 1. A communication scheme used for communication with the first communication module 13 by the second communication module 54 may be the same as a communication scheme used in the first communication module 13.

The controller 55 is connected to each constituent element of the HUD 2. The controller 55 is configured to control each constituent element. The constituent elements controlled by the controller 55 include the irradiator 51, the display panel 52, and the second communication module 54. The controller 55 may include one or more processors. The processors may include a general-purpose processor that reads a specific program and performs a specific function and a dedicated processor specified for a specific process. The dedicated processor may include an ASIC. The processor may include a PLD. The PLD may include an FPGA. The controller 55 may be one of Soc and SiP in which one or a plurality of processors cooperate.

The memory 56 is configured by, for example, any storage device such as a RAM (Random Access Memory) or a ROM (Read Only Memory). The memory 56 is configured to store various kinds of information processed by the controller 55. The memory 56 is configured to store the positions of the eyes of the user in setting, for example. The memory 56 is configured to store left-display subpixels which are on the active area A and correspond to virtual image subpixels which can be viewed by the left eye of the user in the setting. The memory 56 is configured to store right-display subpixels which are on the active area A and correspond to virtual image subpixels which can be viewed by the right eye of the user in the setting. The left-display subpixels are pixels for displaying a left-eye image. The right-display subpixels are pixels for displaying a right-eye image.

Here, the controller 55 will be described in detail. Whether a right-eye image or a left-eye image is displayed at each subpixel of the active area A of the display panel 52 so that the user views an appropriate 3D image, differs depending on the positions of the eyes of the user. When the controller 55 sets an image displayed at each subpixel based on the positions of the eyes of the user in a setting mode before use start of the HUD 2, the user can view an appropriate 3D image at a position in the setting.

However, while the moving body 20 is traveling, positions of the eyes and a posture of the user getting in the moving body 20 are changed in accordance with acceleration and angular acceleration of the moving body 20 and a change in the acceleration and the angular acceleration. For example, when the moving body 20 is traveling on a curved road, a centrifugal force is applied to the user. When a centrifugal force is constant, the posture of the user is maintained without being changed. As a change in the centrifugal force is larger, the position and posture of the user are changed greatly. When the centrifugal force is generally changed until a constant value, a change in the position of the user is small. When the centrifugal force becomes close to a constant value and the change in the centrifugal force becomes smaller, the change in the position and posture of the user converges. When the centrifugal force is abruptly changed until a constant value, a change in the position of the user is large and a change in the position and posture of the user converges while swinging arises due to the change in the position of the user.

Accordingly, the controller 55 is configured to cause the display panel 52 to display a parallax image based on a parameter of a motion of the moving body 20 indicated by a motion signal. For example, the controller 55 may cause subpixels of a part of the display panel to display a left-eye image to be displayed and cause subpixels of another part of the display panel to display a right-eye image to be displayed. The controller 55 is configured to determine a parallax image displayed at each subpixel so that the user can view an appropriate 3D image based on acceleration or angular acceleration of the moving body 20. Hereinafter, an estimation scheme and an actual measurement verification scheme in which the controller 55 determines a parallax image displayed at each subpixel based on the acceleration or the angular acceleration will be described.

<<Estimation Scheme>>

<Setting Mode>

(Determination of Positions of Eyes)

The controller 55 is configured to estimate the positions of the eyes of the user based on the position and posture of the reflector 3 before an image is displayed on the display panel 52 in a normal mode.

For example, the controller 55 is configured to set the position and posture of the reflector 3 in accordance with any method so that the image light emitted from the 3D display device 5 arrives at the eyes of the user. For example, the controller 55 performs control such that the second communication module 54 transmits a driving signal for driving the reflector 3 in a state in which any test image is displayed on the display panel 52. The reflector 3 is configured to receive the driving signal and change the position and the posture based on the driving signal. When the user views the test image, the user inputs information indicating that first adjustment has completed, into the 3D display device 5. The controller 55 is configured to determine that the position and posture of the reflector 3 at the time of inputting the information indicating that the first adjustment has completed are the position and posture of the reflector 3 set in the normal mode.

The controller 55 is configured to estimate the positions of the eyes of the user using a direction of incidence of the image light on the reflector 3 and the position and posture of the optical member 4 based on the position and posture of the reflector 3 set in the normal mode. The controller 55 is configured to store the positions of the eyes (the positions of the eyes in the setting) of the user estimated in the setting mode in the memory 56.

(Determination of Image)

The controller 55 is configured to determine an image displayed at each subpixel so that the user can view a 3D image in a state in which acceleration and angular acceleration is not applied to the moving body 20.

For example, the controller 55 cause the display panel 52 to display calibration images including first and second calibration images viewed by the left and right eyes. The first calibration image may be, for example, a white image that has luminance higher than a predetermined value close to highest luminance. The second calibration image may be, for example, a black image that has luminance lower than a predetermined value close to lowest luminance.

Referring to FIG. 3, the controller 55 is configured to cause n subpixels that continue in the horizontal direction in the subpixel group Pg that includes (2×n) (n=6 in the example of FIG. 3) subpixels, to display the first calibration image. The controller 55 is configured to cause the remaining n subpixels that continue in the horizontal direction, to display the second calibration image. The controller 55 is configured to perform a display of the first and second calibration images continuously in a direction corresponding to an extension direction of the parallax barrier 53. In the example illustrated in FIG. 3, the controller 55 is configured to cause the subpixels P1 to P6 to display the first calibration image and cause the subpixels P7 to P12 to display the second calibration image.

The controller 55 is configured to perform a display of the first and second calibration images in order to be shifted by one subpixel in the horizontal direction. In the example illustrated in FIG. 3, the controller 55 is configured to cause the subpixels P2 to P7 to display the first calibration image and cause the subpixels P8 to P12 and P1 to display the second calibration image. Thereafter, the controller 55 is configured to cause the subpixels P3 to P8 to display the first calibration image and cause subpixels P9 to P12, P1, and P2 to display the second calibration image. In this way, the controller 55 is configured to perform a display of the calibration images of twelve patterns in order.

While the controller 55 performs a display of the plurality of calibration images in order, the user inputs information indicating that second adjustment has completed into the 3D display device 5 in a state in which the user views only a virtual image of the first calibration image with the left eye and views only a virtual image of the second calibration image with the right eye. The controller 55 may determine the subpixels at which the first calibration image is displayed as left-display subpixels and the subpixels at which the second calibration image is displayed as right-display subpixels when the information indicating that the second adjustment has completed is inputted.

When the controller 55 determines the left-display subpixels and the right-display subpixels, the controller 55 is configured to cause the left-display subpixels to display a left-eye image and cause the right-display subpixels to display a right-eye image. The user can view a virtual image of the left-eye image with the left eye and a virtual image of the right-eye image with the right eye. Since the left-eye image and the right-eye image are parallax images that mutually have parallax, the user views a virtual image of a 3D image.

<Normal Mode>

(Estimation of Change in Positions of Eyes in Inter-Eye Direction)

Figure 6A:
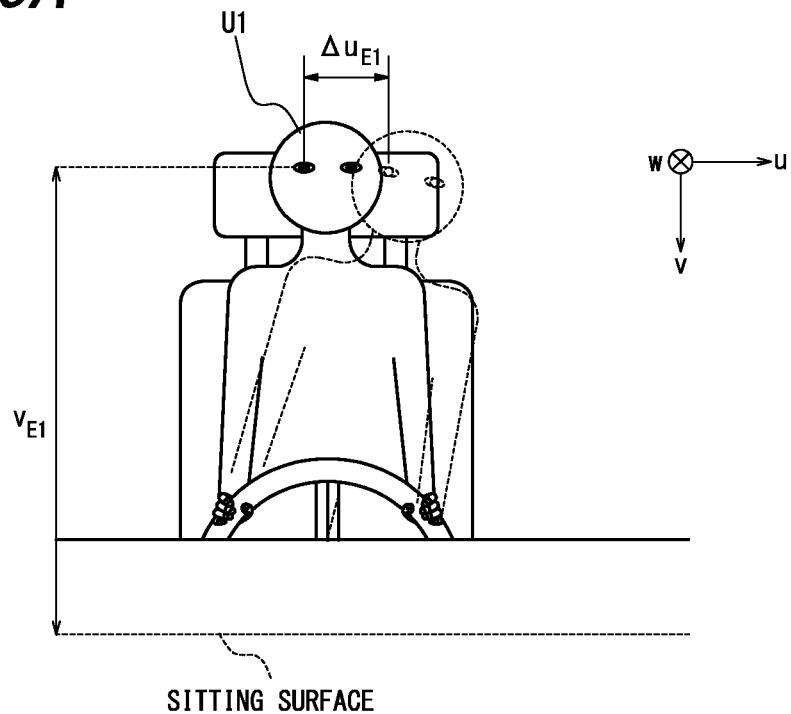
FIG. 6A is a diagram illustrating a change in positions of the eyes of the user in the horizontal direction.

As illustrated in FIG. 6A, the positions of the eyes of a user U1 getting in the moving body 20 are changed in the inter-eye direction in accordance with acceleration of the moving body 20 in the inter-eye direction and a change in the acceleration (a change amount per time and a direction of the change). The controller 55 is configured to acquire acceleration in the inter-eye direction indicated by a motion signal received from the ECU by the second communication module 54. The controller 55 is configured to compute the change in the acceleration in the inter-eye direction. The controller 55 is configured to estimate a change in the positions of the eyes (a change amount and a direction of the change) in the inter-eye direction based on the acceleration in the inter-eye direction and the change in the acceleration. For example, the controller 55 may estimate the positions of the eyes in the inter-eye direction using a table indicating correspondence of the acceleration in the inter-eye direction, the change in the acceleration, and the positions of the eyes in the inter-eye direction. The controller 55 may estimate the positions of the eyes in the inter-eye direction using a conversion expression for computing the positions of the eyes in the inter-eye direction from the acceleration in the inter-eye direction and the change in the acceleration.

The controller 55 is configured to cause the display panel 52 to display a parallax image based on a change in the positions of the eyes. For example, the controller 55 is configured to determine left-display subpixels and right-display subpixels after the change based on the change in the positions of the eyes, the positions of the eyes in the setting stored in the memory 56, and the left-display subpixels and right-display subpixels in the setting. For example, the controller 55 is configured to determine subpixels P corresponding to virtual image subpixels VP viewed with the left eye after the change as left-display subpixels. The controller 55 is configured to determine subpixels P corresponding to virtual image subpixels VP viewed with the right eye after the change as right-display subpixels. The controller 55 is configured to cause the subpixels determined to be the left-display subpixels to display the left-eye image. The controller 55 is configured to cause the subpixels determined to be the right-display subpixels to display the right-eye image.

Figure 7:
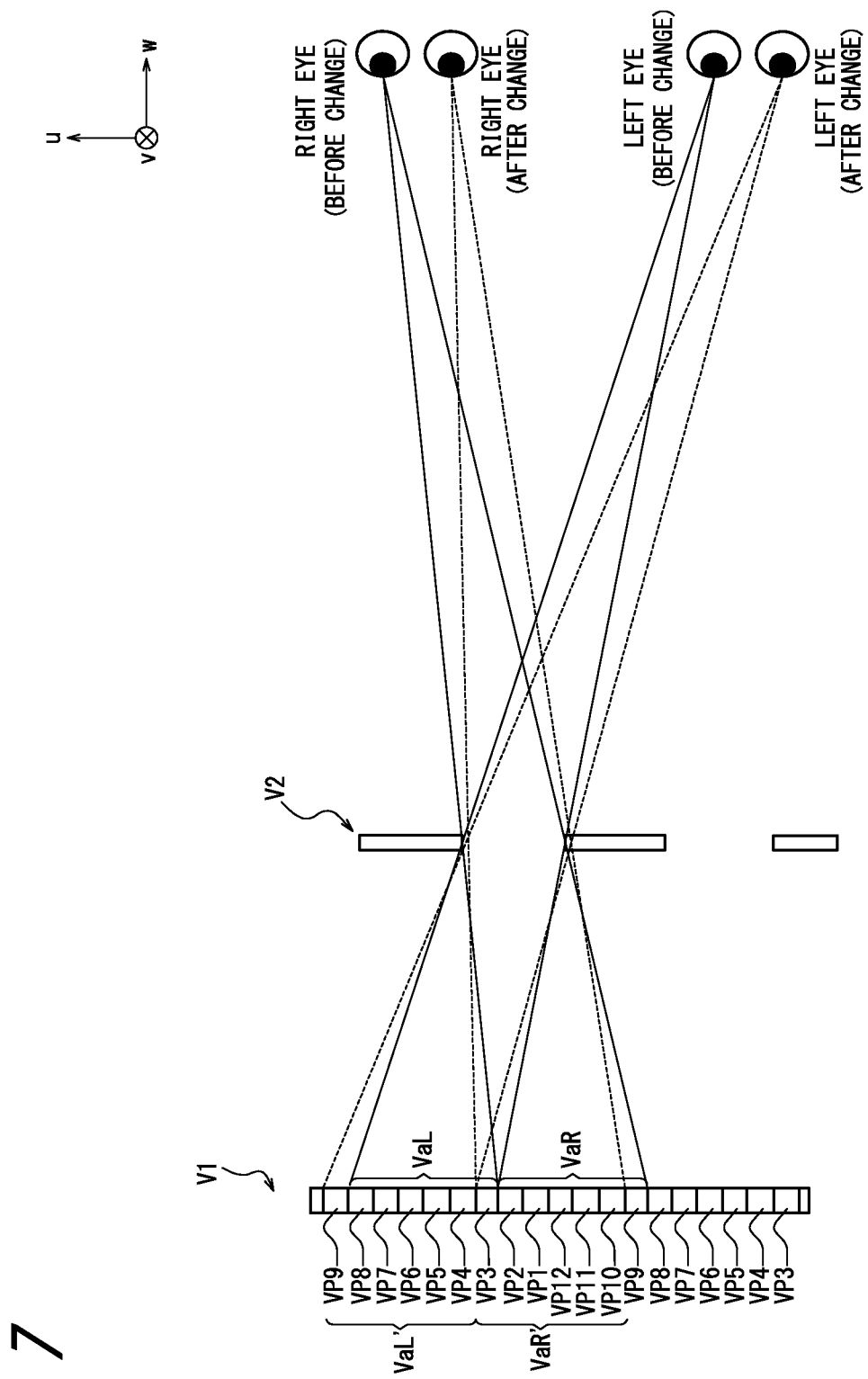
FIG. 7 is a diagram illustrating a relation between a visible region and the positions of the eyes in an inter-eye direction before and after the change.

In the example illustrated in FIG. 7, the controller 55 determines the subpixels P3 to P8 corresponding to virtual image subpixels VP3 to VP8 of the left visible region VaL as left-display subpixels based on the position of the eye in the setting (the positions of the eye before the change), and causes the subpixels P3 to P8 to display the left-eye image. The controller 55 determines the subpixels P9 to P12, P1, and P2 corresponding to virtual image subpixels VP9 to VP12, VP1, and VP2 of the right visible region VaR as right-display subpixels, and causes the subpixels P9 to P12, P1, and P2 to display the right-eye image. After the change, the controller 55 is configured to determine the subpixels P4 to P9 corresponding to virtual image subpixels VP4 to VP9 of a left visible region VaL' as left-display subpixels and causes the subpixels P4 to P9 to display the left-eye image. The controller 55 is configured to determine the subpixels P10 to P12 and P1 to P3 corresponding to virtual image subpixels VP10 to VP12 and VP1 to VP3 of a right visible region VaR' after the change as right-display subpixels and causes the subpixels P10 to P12 and P1 to P3 to display the right-eye image.

Figure 6B:
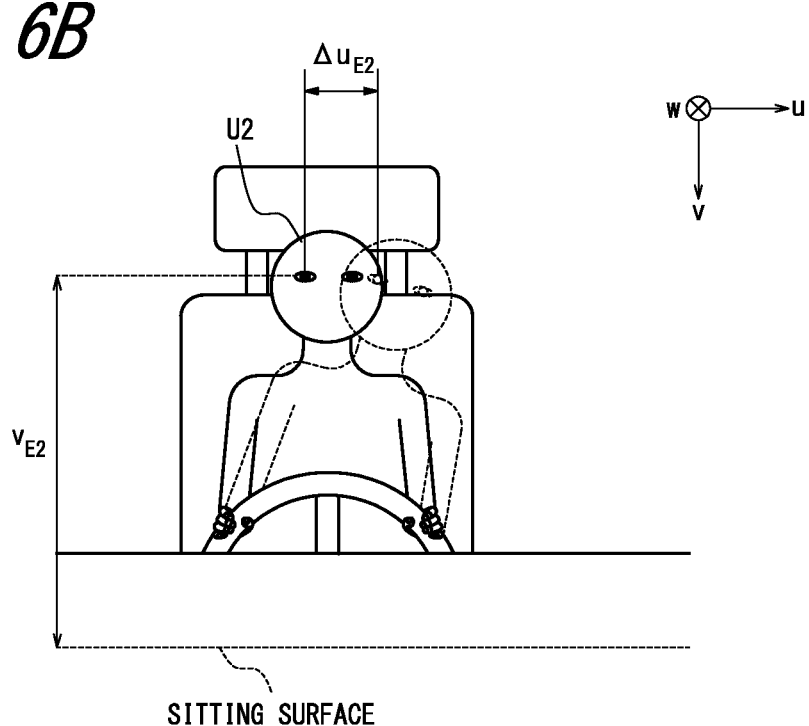
FIG. 6B is a diagram illustrating a change in positions of the eyes of the user shorter than the user illustrated in FIG. 6A in the horizontal direction.

The controller 55 may estimate a change amount of the positions of the eyes based on the positions of the eyes in the height direction determined in the setting mode in addition to the acceleration in the inter-eye direction and the change in the acceleration. When the user is sitting, as illustrated in FIGS. 6A and 6B, an amount of the change in the positions of the eyes of the user in the inter-eye direction is larger as the positions of the eyes from a sitting surface are higher. A height $v_{E1}$ of the positions of the eyes from the sitting surface of the user U1, as illustrated in FIG. 6A, is higher than a height $v_{E2}$ of the positions of the eyes from a sitting surface of a user U2, as illustrated in FIG. 6B. In this case, in the acceleration of the same moving body 20 and the change in the acceleration, a change amount $\Delta u_{E1}$ of the positions of the eyes of the user U1 in the inter-eye direction is greater than a change amount $\Delta u_{E2}$ of the positions of the eyes of the user U2 in the inter-eye direction. The controller 55 may estimate that the change amount of the positions of the eyes in the inter-eye direction based on the acceleration is greater as the positions of the eyes in the height direction are higher.

Figure 8:
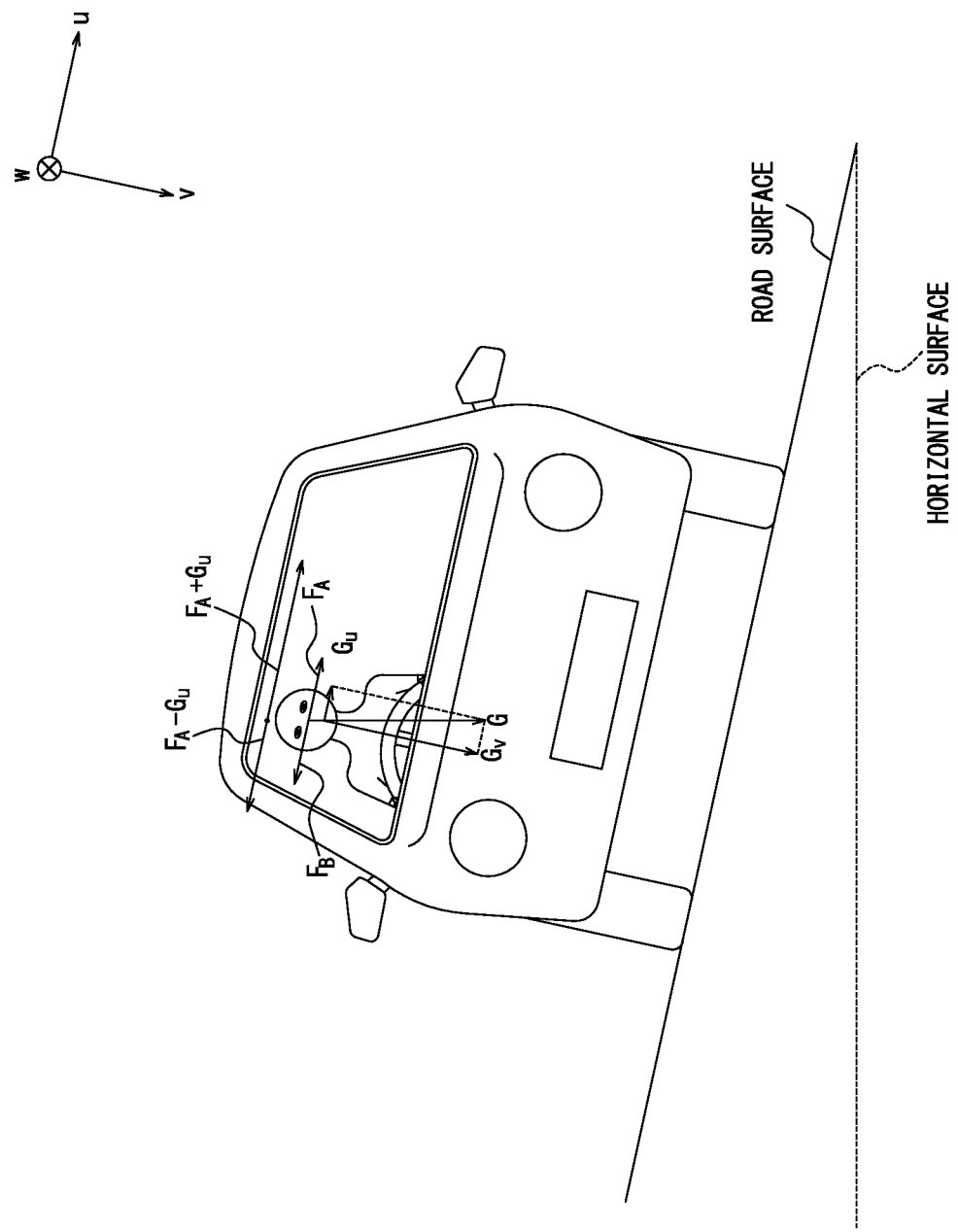
FIG. 8 is a diagram illustrating a change in the positions of the eyes when the height direction diverges from the gravity direction.

The controller 55 may estimate the change amount of the positions of the eyes based on a deviation between the gravity direction and the height direction in addition to the acceleration in the inter-eye direction and the change in the acceleration. For example, as illustrated in FIG. 8, when a road surface on which the moving body 20 is located is inclined with respect to the horizontal surface, the gravity direction does not match the height direction (the v axis direction). The gravity direction is a direction in which the gravity G is applied. In this case, a sum of a component $G_u$ corresponding to the inter-eye direction (the u axis direction) of the gravity G and a force based on the acceleration in the inter-eye direction and the change in the acceleration is applied in the inter-eye direction of the user. Accordingly, when the direction of the component $G_u$ of the gravity in the inter-eye direction matches the direction of a force $F_A$ based on the acceleration and the change in the acceleration, a force $F_A+G_u$ greater than when the gravity direction matches the height direction is applied to the user. Thus, the positions of the eyes of the user are easily changed considerably. When the direction of the component $G_u$ of the gravity in the inter-eye direction is reverse to the direction of the force $F_B$ based on the acceleration and the change in the acceleration, a force $F_B-G_u$ less than when the gravity direction matches the height direction is applied to the user. Thus, the positions of the eyes of the user are easily changed small.

When the direction of the component of the gravity in the inter-eye direction matches the direction of a force based on the acceleration and the change in the acceleration in the inter-eye direction, the controller 55 is configured to change positions at which the left-eye image and the right-eye image are displayed greater than when the gravity direction matches the height direction. When the direction of the component of the gravity in the inter-eye direction is reverse to the direction of the force based on a change in acceleration in the inter-eye direction and angular acceleration, the controller 55 is configured to change positions at which the left-eye image and the right-eye image are displayed smaller than when the gravity direction matches the height direction.

(Estimation of Change in Positions of Eyes in Anteroposterior Direction)

Figure 9A:
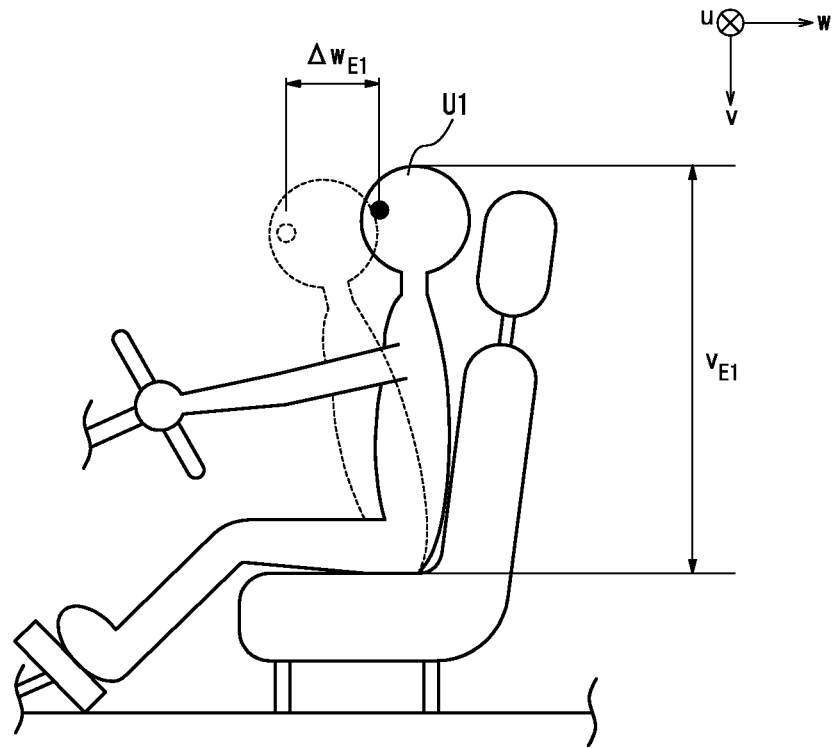
FIG. 9A is a diagram illustrating a change in the positions of the eyes of the user in the anteroposterior direction.

As illustrated in FIG. 9A, the positions of the eyes of the user U1 getting in the moving body 20 can be changed in the anteroposterior direction in accordance with the acceleration in the anteroposterior direction and the change in the acceleration of the moving body 20. The controller 55 is configured to determine an image displayed at each subpixel based on the change in the positions of the eyes in the anteroposterior direction.

For example, the controller 55 is configured to acquire acceleration in the anteroposterior direction indicated by the motion signal received from the ECU by the second communication module 54. The controller 55 is configured to compute a change in the acceleration in the anteroposterior direction. The controller 55 is configured to estimate a change $\Delta V d$ in the positions of the eyes in the anteroposterior direction at the positions of the eyes in the setting based on the acceleration in the anteroposterior direction and the change in the acceleration. For example, the controller 55 may estimate the positions of the eyes in the anteroposterior direction using a table indicating correspondence of the acceleration in the anteroposterior direction, the change in the acceleration, and the positions of the eyes in the anteroposterior direction. The controller 55 may estimate the positions of the eyes in the anteroposterior direction using a conversion expression for computing the positions of the eyes in the anteroposterior direction from the acceleration in the anteroposterior direction and the change in the acceleration.

Figure 10:
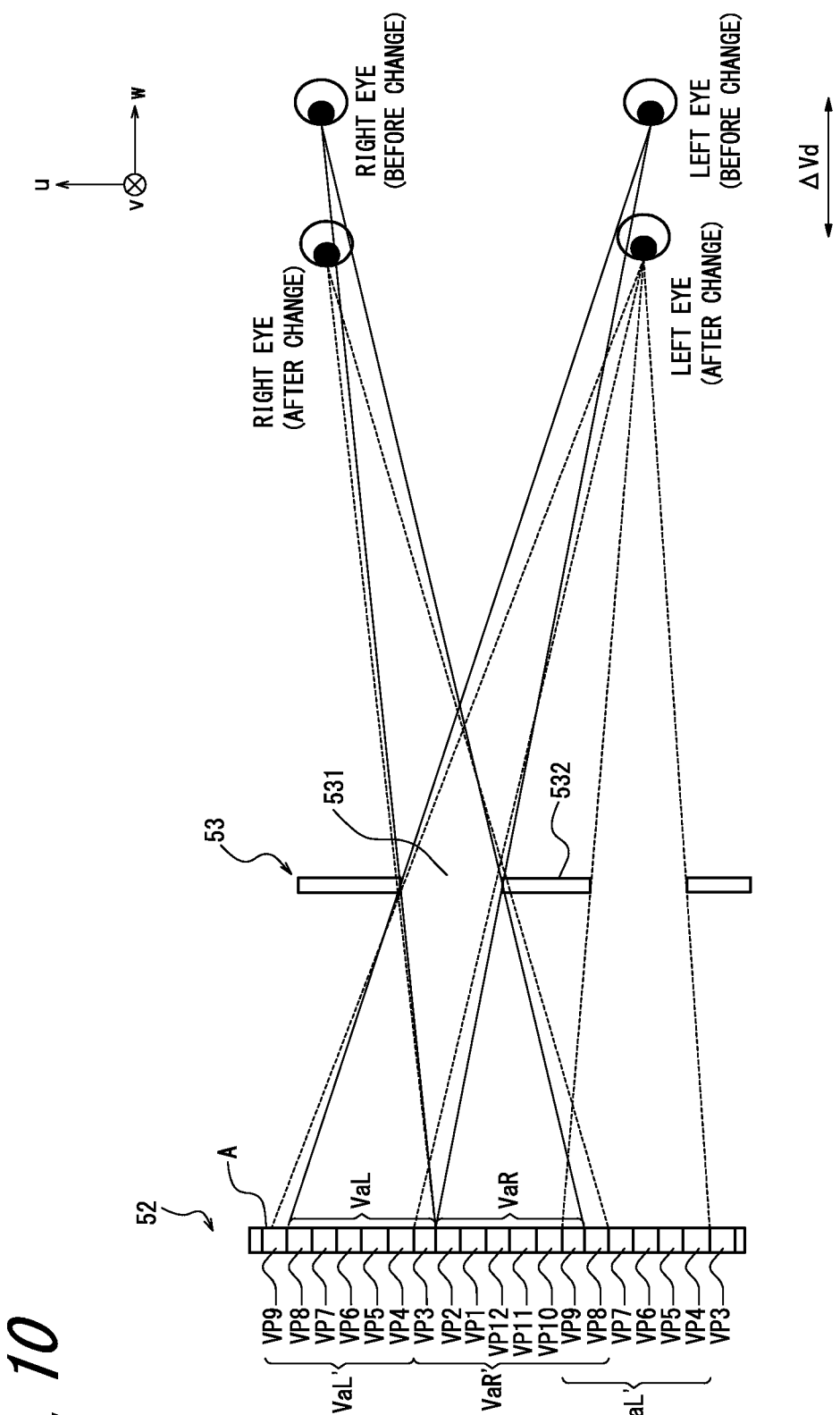
FIG. 10 is a diagram illustrating a relation between a visible region and the positions of the eyes in the anteroposterior direction before and after the change.

As illustrated in FIG. 10, as the change $\Delta V d$ at the time of change in the positions of the eyes in the anteroposterior direction is greater, regions which serve as the left visible region VaL' and the right visible region VaR' are widened more. When the left-eye image is displayed at the subpixels P corresponding to the virtual image subpixels VP included in the region, the right eye of the user views the virtual image of the left-eye image. When the right-eye image is displayed at the subpixels P corresponding to the virtual image subpixels VP included in the region, the left eye of the user views the virtual image of the right-eye image. Accordingly, crosstalk occurs and the user cannot view an appropriate 3D image.

To reduce the crosstalk, for example, the controller 55 may determine that the subpixels P corresponding to the virtual image subpixels VP which can be viewed with both the left eye and the right eye are black display subpixels and may cause the subpixels P to display a black image. The black image is, for example, an image that has predetermined luminance as in black. The predetermined luminance can be set to a value corresponding to luminance of the lowest grayscale corresponding to luminance of grayscale conforming to the luminance in a grayscale label at which the subpixels P can be displayed. For example, the controller 55 may determine that the subpixels P corresponding to the virtual image subpixels VP which can be viewed by the left eye and cannot be viewed by the right eye are the left-display subpixels and may cause the subpixels P to display the left-eye image. For example, the controller 55 may determine that the subpixels P corresponding to the virtual image subpixels VP which cannot be viewed by the left eye and can be viewed by the right eye are the right-display subpixels and may cause the subpixels P to display the left-eye image. Thus, since the right-eye image is not viewed by the left eye of the user and the left-eye image is not viewed by the right eye of the user, occurrence of the crosstalk can be reduced.

In the example illustrated in FIG. 10, the controller 55 displays the left-eye image at the subpixels P3 to P8 corresponding to the virtual image subpixels VP3 to VP8 which can be viewed by the left eye based on the positions of the eyes in the setting (before the change). The controller 55 causes the subpixels P9 to P12, P1, and P2 corresponding to the virtual image subpixels VP9 to VP12, VP1, and VP2 which can be viewed by the right eye to display the right-eye image. When the positions of the eyes are changed, the virtual image subpixels VP which can be viewed by the left eye are the virtual image subpixels VP4 to VP9. At this time, the virtual image subpixels VP which can be viewed by the right eye are the virtual image subpixels VP8 to VP12, VP1, and VP2. The virtual image subpixels VP8 and VP9 are subpixels which can be viewed by both the left eye and the right eye. The controller 55 may perform a display of a black image setting the subpixels P8 and P9 corresponding to the virtual image subpixels VP8 and VP9 as black display subpixels. The controller 55 may determine the subpixels P4 to P7 corresponding to the virtual image subpixels VP4 to VP7 as the left-display subpixels and cause the subpixels P4 to P7 to display the left-eye image. The controller 55 may determine the subpixels P10 to P12, P1, and P2 corresponding to the virtual image subpixels VP10 to VP12, VP1, and VP2 as the right-display subpixels and cause the subpixels P10 to P12, P1, and P2 to display the right-eye image.

Figure 9B:
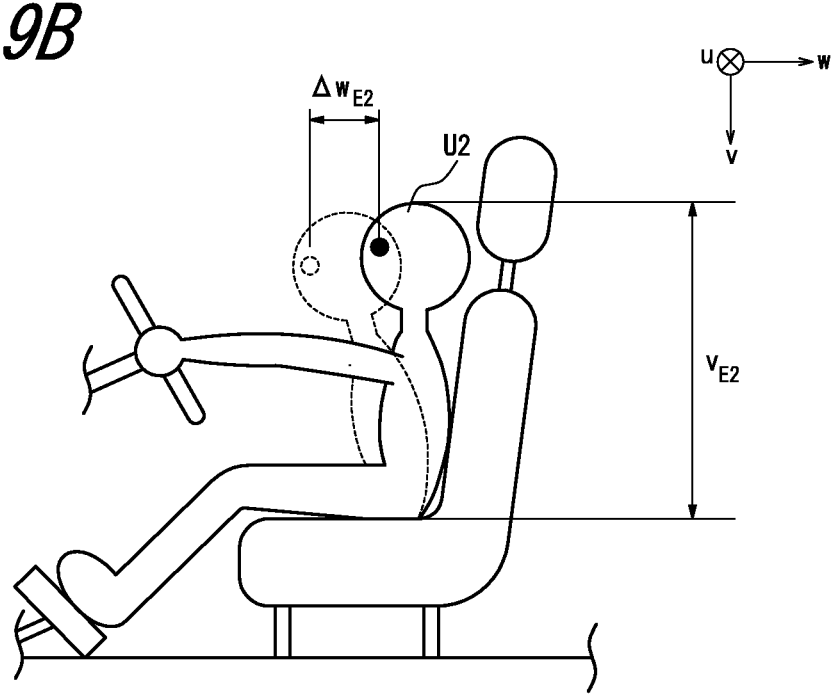
FIG. 9B is a diagram illustrating a change in the positions of the eyes of the user shorter than the user illustrated in FIG. 9A in the anteroposterior direction.

The controller 55 may estimate a change amount of the positions of the eyes based on the positions of the eyes in the height direction determined in the setting mode in addition to the acceleration. When the user is sitting, as illustrated in FIGS. 9A and 9B, an amount of change in the positions of the eyes of the user in the anteroposterior direction is greater as the positions of the eyes from the sitting surface are higher. A height $v_{E1}$ of the positions of the eyes from the sitting surface of the user U1, as illustrated in FIG. 9A, is higher than a height $v_{E2}$ of the positions of the eyes from a sitting surface of the user U2, as illustrated in FIG. 9B. In this case, in the acceleration of the same moving body 20 and the change in the acceleration, a change amount $\Delta w_{E1}$ of the positions of the eyes of the user U1 in the anteroposterior direction is greater than $\Delta w_{E2}$ of the positions of the eyes of the user U2 in the anteroposterior direction. The controller 55 may estimate that the change amount of the positions of the eyes in the anteroposterior direction based on the acceleration is greater as the positions of the eyes in the height direction are higher.

The controller 55 may estimate the change amount of the positions of the eyes based on angular acceleration in addition to the acceleration or instead of the acceleration.

(Display of Image)

The controller 55 is configured to determine an image displayed at each subpixel using the positions of the eyes in the setting, the left-display subpixels and the right-display subpixels in the setting, and characteristics of the 3D display device 5 based on the change in the positions of the eyes in the inter-eye direction and the anteroposterior direction. The controller 55 is configured to cause the display panel 52 to display an image based on the determination.

<<Actual Measurement Verification Scheme>>

<Setting Mode>

The controller 55 is configured to determine positions of the left eye and the right eye, and the left-display subpixels and the right-display subpixels in the setting as in the estimation scheme.

<Normal Mode>

(Estimation of Change in Positions of Eyes in Inter-Eye Direction)

The controller 55 is configured to cause the imaging device 1 to generate a captured image. For example, the controller 55 is configured to perform control such that an imaging control signal is generated and the second communication model 54 transmits the imaging control signal to the imaging device 1. The controller 55 is configured to acquire a captured image generated by the imaging device 1 receiving the imaging control signal. Any timing at which the controller 55 causes the imaging device 1 to generate a captured image may be used. For example, the controller 55 may cause the imaging device 1 to generate a captured image at predetermined time intervals. For example, when the controller 55 determines that the acceleration is equal to or greater than a threshold, the controller 55 may cause the imaging device 1 to generate a captured image. The threshold is a minimum value of a value at which the change in the eyes of the user in the case in which the acceleration is equal to or greater than the threshold is expected to be highly likely not to match the change in the eyes estimated by the above-described table or conversion expression. The threshold may be decided in advance by an experiment or the like.

The controller 55 is configured to estimate the positions of the eyes of the user based on the captured image. For example, the controller 55 may estimate the positions of the eyes in the real space based on a positional relation between an image of a predetermined object contained in a single captured image generated by the imaging element 12 and an image on the eyes. The predetermined object is an object fixed and attached to the moving body 20 and is, for example, a headrest of a driver seat, a frame of a side window, or the like.

The controller 55 may estimate the positions of the eyes in the real space based on an image of at least a part of the body of the user and the position of the image of the predetermined object in the single captured image generated by the imaging element 12, and the position of the predetermined object in the real space. The part of the body may be, for example, a top part of the head, the shoulder, an ear, or the like.

The controller 55 is configured to estimate the change of the positions of the eyes of the user based on the acceleration in the inter-eye direction and the change in the acceleration as in the estimation scheme.

The controller 55 is configured to compute a difference between a change in the positions of the eyes estimated based on the captured image from the positions of the eyes in the setting and a change in the positions of the eyes estimated based on the acceleration in the inter-eye direction and the change in the acceleration. Based on the difference, the controller 55 is configured to calibrate a correspondence relation between the acceleration in the inter-eye direction and the change in the acceleration, and the change in the positions of the eyes. For example, based on the difference, the controller 55 may calibrate the table indicating correspondence between the acceleration in the inter-eye direction and the change in the acceleration, and the change in the positions of the eyes. Based on the difference, the controller 55 may calibrate the conversion expression for computing a change in the positions of the eyes from the acceleration in the inter-eye direction and the change in the acceleration.

Thereafter, the controller 55 is configured to determine the positions of the eyes in the anteroposterior direction based on the acceleration in the inter-eye direction, as in the estimation scheme, using the calibrated correspondence relation until the correspondence relation is calibrated subsequently.

(Estimation of Change in Positions of Eyes in Anteroposterior Direction)

The controller 55 is configured to acquire acceleration in the anteroposterior direction indicated by a motion signal received from the ECU by the second communication module 54. The controller 55 is configured to compute a change in the acceleration in the anteroposterior direction based on the acceleration in the anteroposterior direction. The controller 55 is configured to extract a change in the positions of the eyes in the anteroposterior direction based on the acceleration in the anteroposterior direction and the change in the acceleration.

The controller 55 is configured to acquire a captured image generated by the imaging device 1 and estimate the positions of the eyes of the user based on the captured image.

The controller 55 is configured to compute a difference between the change in the positions of the eyes estimated based on the captured image from the change in the setting and the change in the positions of the eyes estimated based on the acceleration in the anteroposterior direction and the change in the acceleration. Based on the difference, the controller 55 is configured to calibrate a correspondence relation between the acceleration in the anteroposterior direction and the change in the acceleration, and the change in the positions of the eyes. For example, based on the difference, the controller 55 may calibrate the table indicating correspondence between the acceleration in the anteroposterior direction and the change in the acceleration, and the change in the positions of the eyes. Based on the difference, the controller 55 may calibrate the conversion expression for computing a change in the positions of the eyes from the acceleration in the anteroposterior direction and the change in the acceleration. Thereafter, the controller 55 determines the positions of the eyes in the anteroposterior direction based on the acceleration in the anteroposterior direction, as in the estimation scheme, using the calibrated correspondence relation until the correspondence relation is calibrated subsequently.

(Display of Image)

The controller 55 is configured to cause the display panel 52 to display an image based on the change in the positions of the eyes in the inter-eye direction and the anteroposterior direction as in the estimation scheme.

<<Process Flow Using Estimation Scheme>>

Figure 11:
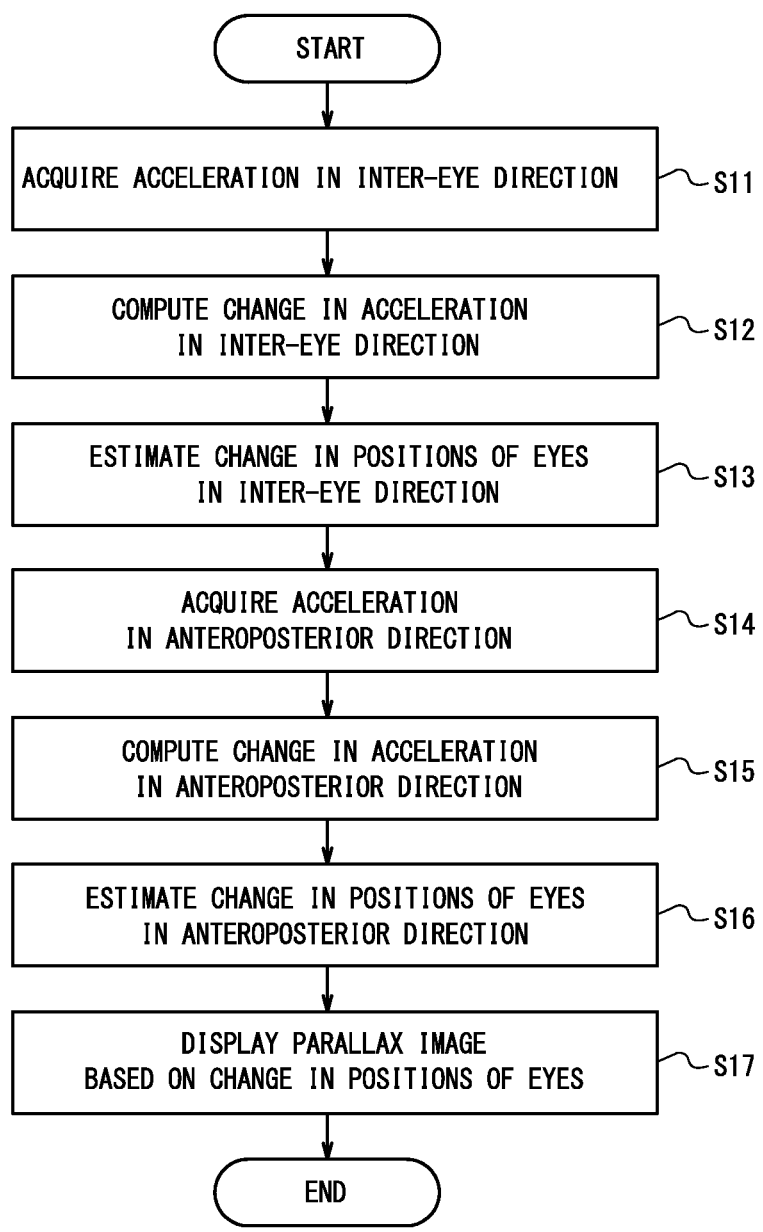
FIG. 11 is a flowchart illustrating an example of a process flow of a controller using an estimation scheme.

Next, a process in the normal mode performed by the controller 55 using the estimation scheme will be described in detail with reference to FIG. 11. The controller 55 determines the positions of the eyes of the user in the real space (the positions of the eyes in the setting), and the left-display subpixels and the right-display subpixels before the process starts in the normal mode. The controller 55 stores the positions of the eyes of the user, and the left-display subpixels and the right-display subpixels in the memory 56. The controller 55 starts the process when a start instruction is inputted into the HUD 2 to start the process in the normal mode.

First, the controller 55 acquires the acceleration in the inter-eye direction indicated by the motion signal received from the ECU by the second communication module 54 (step S11).

When the acceleration in the inter-eye direction is acquired in step S11, the controller 55 computes the change in the acceleration in the inter-eye direction (step S12).

When the change in the acceleration is computed in step S12, the controller 55 estimates the change in the positions of the eyes in the inter-eye direction based on the acceleration in the inter-eye direction and the change in the acceleration (step S13).

Subsequently, the controller 55 acquires the acceleration in the anteroposterior direction indicated by the motion signal received from the ECU by the second communication module 54 (step S14).

When the acceleration in the anteroposterior direction is acquired in step S14, the controller 55 computes the change in the acceleration in the anteroposterior direction (step S15).

When the change in the acceleration in the anteroposterior direction is computed in step S15, the controller 55 estimates the change in the positions of the eyes in the anteroposterior direction based on the acceleration in the anteroposterior direction and the change in the acceleration (step S16).

The controller 55 causes the display panel 52 to displays the image using the positions of the eyes in the setting stored in the memory 56 and the left-display subpixels and the right-display subpixels in the setting based on the change in the eyes in the inter-eye direction and the anteroposterior direction (step S17).

<<Process Flow Using Actual Measurement Verification Scheme>>

Figure 12:
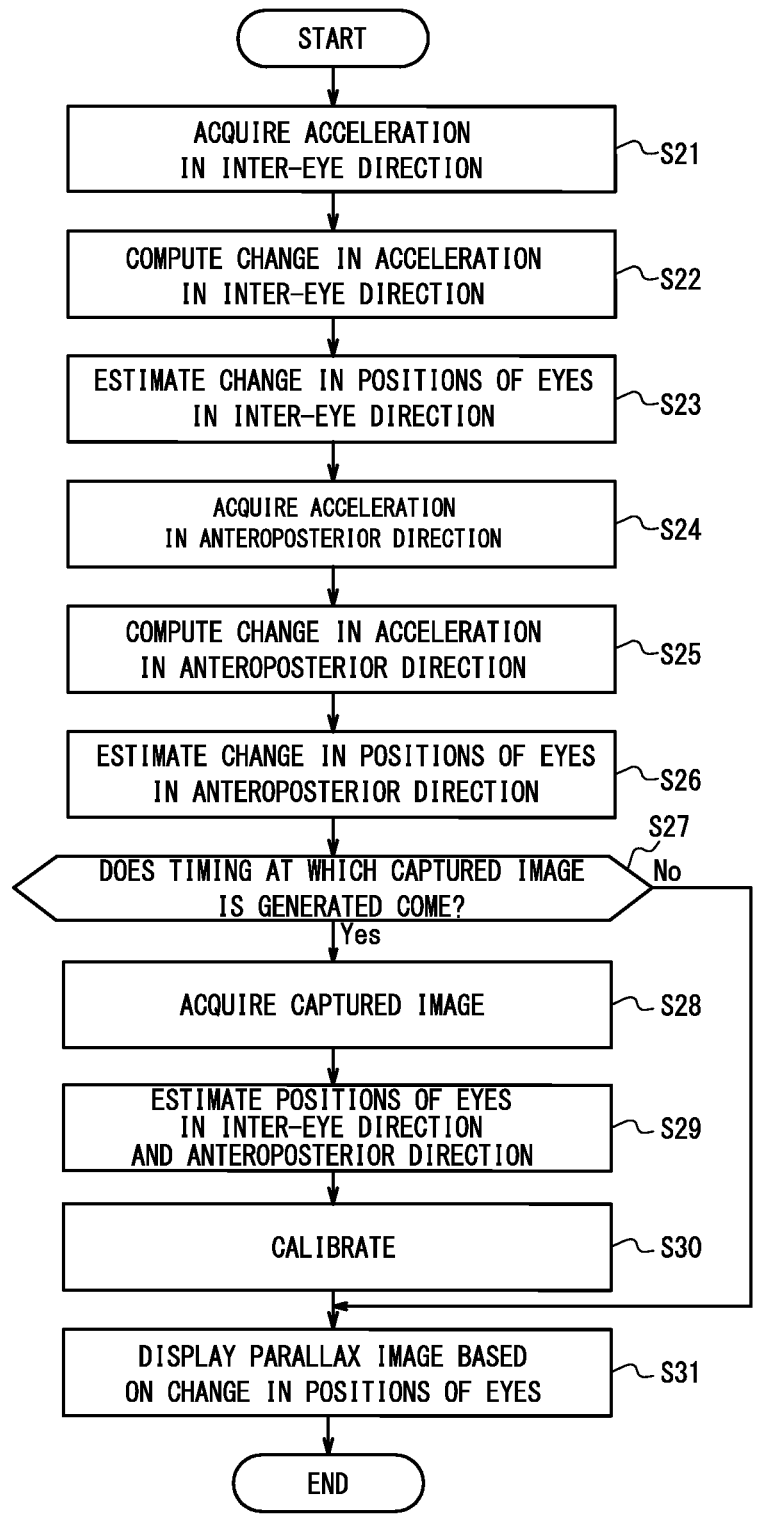
FIG. 12 is a flowchart illustrating an example of a process flow of a controller using an actual measurement verification scheme.

A process in the normal mode performed by the controller 55 using the actual measurement verification scheme will be described in detail with reference to FIG. 12. The controller 55 estimates the positions of the eyes of the user in the real space (the positions of the eyes in the setting) and determines the left-display subpixels and the right-display subpixels before the process starts in the normal mode. The controller 55 stores the positions of the eyes of the user, and the left-display subpixels and the right-display subpixels in the memory 56. The controller 55 starts the process when a start instruction is inputted into the HUD 2 to start the process in the normal mode.

First, the controller 55 acquires the acceleration in the inter-eye direction indicated by the motion signal received from the ECU by the second communication module 54 (step S21).

When the acceleration in the inter-eye direction is acquired in step S21, the controller 55 computes the change in the acceleration in the inter-eye direction (step S22).

When the change in the acceleration in the inter-eye direction is computed in step S22, the controller 55 estimates the change in the positions of the eyes in the inter-eye direction based on the acceleration in the inter-eye direction and the change in the acceleration (step S23).

The controller 55 acquires the acceleration in the anteroposterior direction indicated by the motion signal received from the ECU by the first communication module 54 (step S24).

When the acceleration in the anteroposterior direction is acquired in step S24, the controller 55 computes the change in the acceleration in the anteroposterior direction (step S25).

When the change in the acceleration in the anteroposterior direction is computed in step S25, the controller 55 estimates the change in the positions of the eyes in the anteroposterior direction based on the acceleration in the anteroposterior direction and the change in the acceleration (step S26).

The controller 55 determines whether a timing at which the imaging device 1 is caused to generate a captured image comes (step S27).

When the controller 55 determines in step S27 that the timing at which the imaging device 1 is caused to generate a captured image comes, the controller 55 causes the imaging device 1 to generate the captured image and acquires the captured image (step S28).

The controller 55 estimates the change in the positions of the eyes in the inter-eye direction and the anteroposterior direction based on the captured image (step S29).

The controller 55 calibrates the correspondence relation between the change in the positions of the eyes, and the acceleration in the inter-eye direction and the change in the acceleration using the difference between the change in the positions of the eyes in the inter-eye direction estimated in step S23 and the change in the positions of the eyes in the inter-eye direction estimated in step S29. The controller 55 calibrates the correspondence relation between the change in the positions of the eyes, and the acceleration in the anteroposterior direction and the change in the acceleration using the difference between the change in the positions of the eyes in the anteroposterior direction estimated in step S26 and the change in the positions of the eyes in the anteroposterior direction estimated in step S29 (step S30).

When the correspondence relation is calibrated in step S30, the controller 55 determines the positions of the eyes of the user using the calibrated correspondence relation based on the acceleration and the change in the acceleration. The controller 55 causes the display panel 52 to display the image based on the positions of the eyes of the user. When the controller 55 determines in step S27 that the timing at which the captured image is generated does not come, the controller 55 determines the positions of the eyes of the user based on the preset or calibrated correspondence relation based on the acceleration and the change in the acceleration. The controller 55 causes the display panel 52 to display the image based on the positions of the eyes of the user (step S31).

An information processing device such as a computer can be adopted as the 3D display device 5 according to the embodiment. The information processing device can be realized by storing a program that describes processing content for realizing each function of the 3D display device 5 according to the embodiment in a memory of the information processing device and causing a controller of the information processing device to read and execute the program. The information processing device may be configured to read and mount the program from a non-transitory computer-readable medium. The non-transitory computer-readable medium includes a magnetic storage medium, an optical storage medium, a magneto-optical storage medium, and a semiconductor storage medium, but the disclosure is not limited thereto. The magnetic storage medium includes a magnetic disk, a hard disk, and a magnetic tape. The optical storage medium includes an optical disc such as a CD (Compact Disc), a DVD, a Blu-ray (registered trademark) disc. The semiconductor storage medium includes a ROM (Read Only Memory), an EEPROM (Electrically Erasable Programmable Read-Only Memory), a flash memory.

As described above, in the embodiment, the 3D display device 5 is configured to receive the motion signal indicating the parameter of a motion of the moving body 20 and display a parallax image on the display panel 52 based on the parameter indicated by the motion signal. Therefore, the 3D display device 5 can estimate the change in the positions of the eyes of the user with an operation of the moving body 20 and can display the parallax image so that the user can appropriately view a 3D image based on the change. Since the 3D display device 5 displays the parallax image based on the parameter of the motion rather than based on the captured image, a processing load on the captured image can be reduced.

In the embodiment, the 3D display device 5 is configured to display the parallax image based on the positions of the eyes of the user in the height direction. For example, when the user is sitting, the positions of the eyes are further changed in the inter-eye direction as the positions of the eyes are higher in the height direction despite the same change in the parameter of the motion. The positions of the eyes in the inter-eye direction are changed depending on the positions of the eyes in the height direction as well as the parameter of the motion. The 3D display device 5 displays the parallax image in accordance with the positions of the eyes in the height direction so that the user can view the 3D image more appropriately.

The controller 55 is configured to estimate the positions of the eyes of the user in the height direction based on the position and posture of the reflector 3 which reflects the image light. In the communication HUD system 100, for example, it is not necessary to provide an imaging device that images the eyes of the user to estimate the positions of the eyes. The 3D display device 5 can cause the user to view a 3D image appropriately with a simple configuration.

In the embodiment, the 3D display device 5 is configured to display the parallax image on the display panel 52 based on a divergence between the height direction of the user and the gravity direction. When the gravity direction diverges from the height direction, the component $G_u$ of the gravity G in the inter-eye direction is generated. In this case, not only a force in the inter-eye direction based on an operation of the moving body 20 but also the component $G_u$ of the gravity G in the inter-eye direction is applied to the user. Thus, the change in the positions of the eyes of the user differs from a change when only the force based on the operation of the moving body 20 in the inter-eye direction is applied. The 3D display device 5 can estimate the positions of the eyes accurately in the inter-eye direction not only based on the divergence between the height direction of the user and the gravity direction but also based on the component $G_u$ of the gravity G in the inter-eye direction. Since the 3D display device 5 displays the parallax image on the display panel 52 based on the more accurate positions of the eyes, the user can view the 3D image more appropriately.

The above-described embodiment has been described as a representative example, but it should be apparent to those skilled in the art that many changes and substitutions can be made within the scope and gist of the present invention. Accordingly, the invention is not limited by the above-described embodiment and various modifications and changes can be made without departing from the scope of the claims. For example, a plurality of configuration blocks described in an embodiment and an example can be combined into one configuration block or one configuration block can be divided.

For example, in the above-described embodiment, the controller 55 performs steps S11 to S13, and then performs steps S14 to S16, but the invention is not limited thereto. For example, the controller 55 may perform steps S14 to S16, and then may perform steps S11 to S13. The controller 55 may also perform steps S11 to S13 and steps S14 to S16 in parallel.

For example, in the above-described embodiment, the controller 55 performs steps S21 to S23, and then performs steps S24 to S26, but the invention is not limited thereto. For example, the controller 55 may perform steps S24 to S26, and then may perform steps S21 to S23. The controller 55 may also perform steps S21 to S23 and steps S24 to S26 in parallel.

Figure 13:
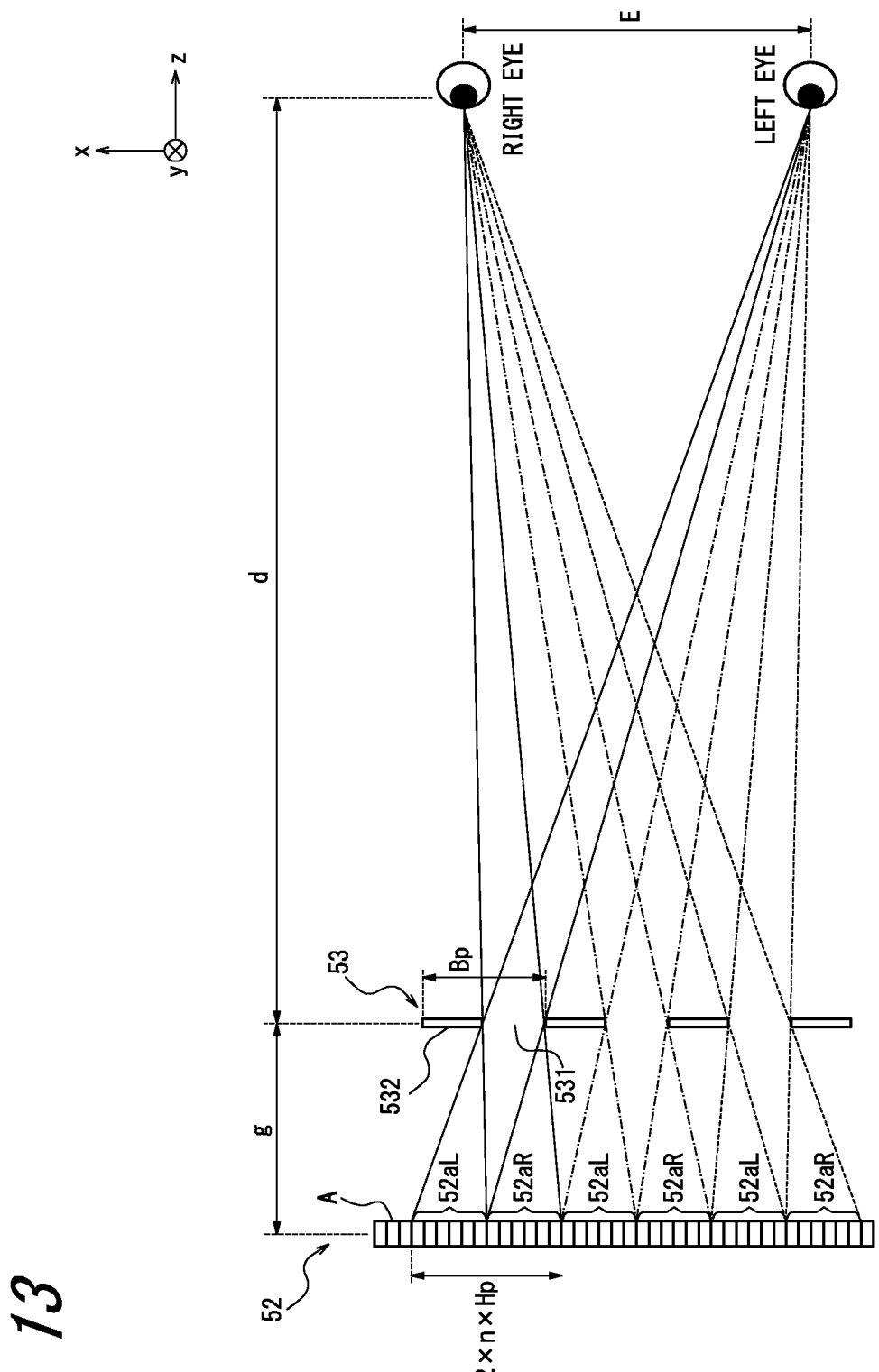
FIG. 13 is a diagram illustrating a positional relation between the eyes of the user and a 3D display device when a user directly views a display panel.

For example, in the above-described embodiment, as illustrated in FIG. 13, the 3D display device 5 may be disposed so that the image light emitted from the display panel 52 transmits through the light-transmitting region 531 of the parallax barrier 53 and is directly propagated to the eyes of the user without being involved in the reflector 3 and the optical member 4. In the configuration, the controller 55 sets the subpixels on the active area A directly viewed by the left eye of the user as the left-display subpixels. The controller 55 sets the subpixels included in a right visible region 52aR directly viewed by the right eye of the user as the right-display subpixels.

Figure 14:
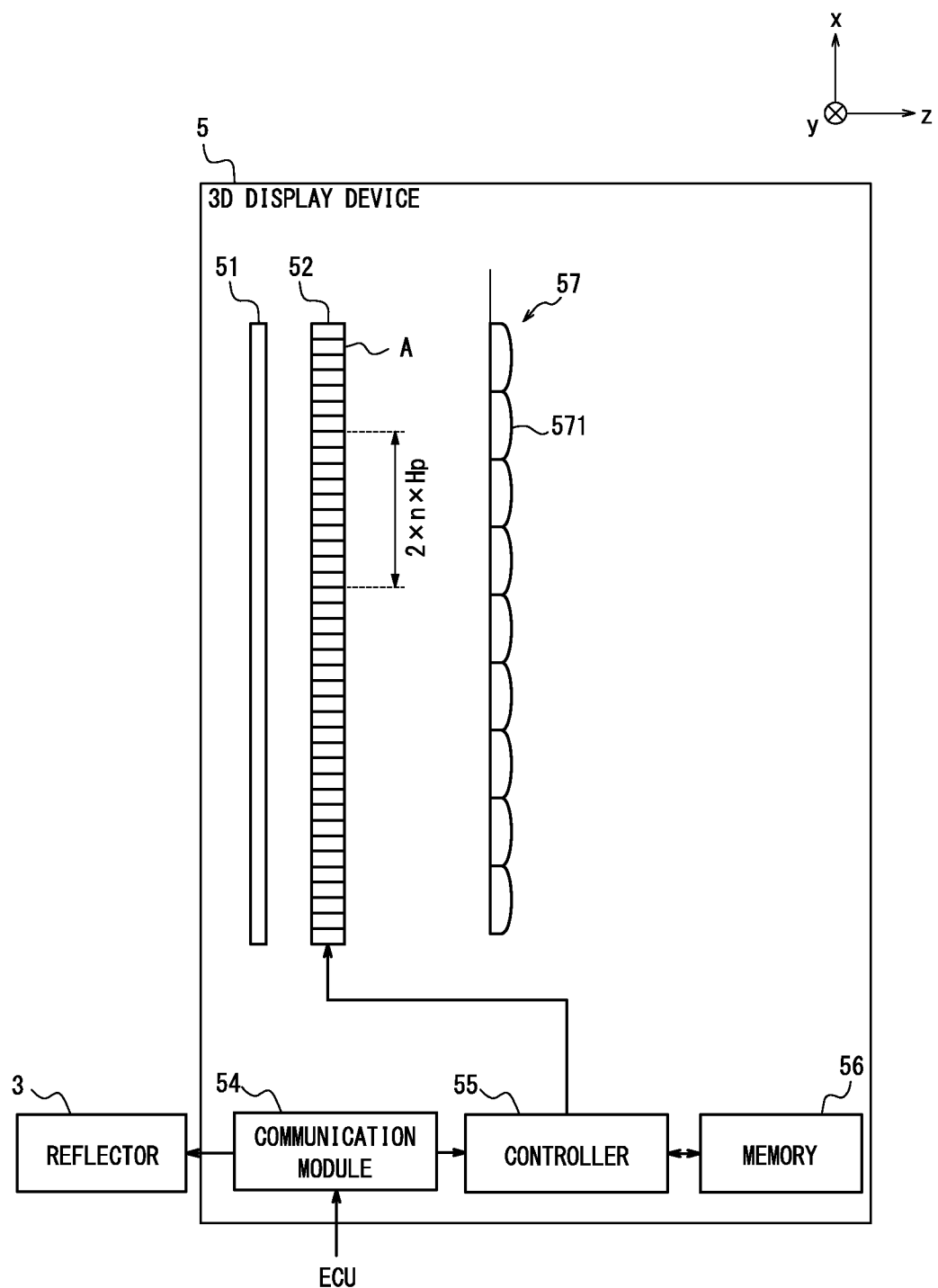
FIG. 14 is a diagram illustrating an overall configuration of a 3D display device when an optical element is a lenticular lens.

For example, in the above-described embodiment, the optical element is the parallax barrier 53, but the invention is not limited thereto. For example, as illustrated in FIG. 14, the optical element may be a lenticular lens 57. In this case, the lenticular lens 57 is configured so that cylindrical lens 571 extending in the vertical direction are arranged in the horizontal direction on a plane. The lenticular lens 57 causes image light emitted from some subpixels to propagate to the position of the left eye of the user and causes image light emitted from some other subpixels to propagate to the position of the right eye of the user as in the parallax barrier 53.

REFERENCE SIGNS LIST

1: Imaging device
2: Head-up display
3: Reflector

4: Optical member
5: 3D display device
11: Imaging optical system
12: Imaging element
13: First communication module
20: Moving body
51: Irradiator
52: Display panel
53: Parallax barrier
54: Second communication module
55: Controller
531: Light-transmitting region
532: Dimming region
A: Active area
V1: First virtual image
V2: Second virtual image
VaL: Left visible region
VaR: Right visible region
52aR: Right visible region
100: Communication head-up display system

The invention claimed is:

1. A 3D display device, comprising:
a display panel mounted on a moving vehicle in which a user is, the display panel displaying a parallax image to the user;
an optical element which defines a propagation direction of image light emitted from the display panel;
a communication circuitry which receives a motion signal indicating a parameter of a motion of the moving vehicle, the parameter including acceleration indicating a change in the motion of the moving vehicle;
a controller which causes the display panel to display the parallax image based on the parameter indicated by the motion signal;
an imaging device having an imaging range containing a face of the user; and
a table provided in the controller, the table storing data indicating correspondence between acceleration of the moving vehicle in an inter-eye direction of the user and positions of eyes of the user in the inter-eye direction,
wherein, when first positions of the eyes estimated based on a captured image generated by the imaging device and second positions of the eyes estimated based on the acceleration in the inter-eye direction indicated by the motion signal are different from each other, the controller calibrates the data stored in the table by using a difference between the first positions and the second positions.

2. The 3D display device according to claim 1, wherein the controller causes the display panel to display the parallax image based on a change amount per time of the parameter.

3. The 3D display device according to claim 1, wherein the controller causes the display panel to display the parallax image based on magnitude of the parameter.

4. The 3D display device according to claim 1, wherein a first image which is viewed by a first eye of a user, and a second image which is viewed by a second eye of the user and has a parallax with respect to the first image constitute parallax image and are displayed on the display panel, and the controller controls the display panel such that, as a change amount of the parameter of the motion is larger, display positions of the first image and the second image on the display panel are changed more.

5. The 3D display device according to claim 1, wherein the controller causes the display panel to display the parallax image based on a divergence between a gravity direction and a height direction of the user.

6. A head-up display, comprising:
a 3D display device comprising a display panel mounted on a moving vehicle in which a user is, the display panel displaying a parallax image to the user, an optical element which defines a propagation direction of image light emitted from the display panel, a communication circuitry which receives a motion signal indicating a parameter of a motion of the moving vehicle, the parameter including acceleration indicating a change in the motion of the moving vehicle, a controller which causes the display panel to display the parallax image based on the parameter indicated by the motion signal, an imaging device having an imaging range containing a face of the user, and a table provided in the controller, the table storing data indicating correspondence between acceleration of the moving vehicle in an inter-eye direction of the user and positions of eyes of the user in the inter-eye direction; and
an optical member which reflects the image light emitted from the 3D display device and causes the reflected light to reach the eyes of the user,
wherein, when first positions of the eyes estimated based on a captured image generated by the imaging device and second positions of the eyes estimated based on the acceleration in the inter-eye direction indicated by the motion signal are different from each other, the controller calibrates the data stored in the table by using a difference between the first positions and the second positions.

7. A moving vehicle, comprising:
a head-up display comprising
a 3D display device comprising a display panel which displays a parallax image to a user, an optical element which defines a propagation direction of image light emitted from the display panel, a communication circuitry which receives a motion signal indicating a parameter of a motion of the moving vehicle, the parameter including acceleration indicating a change in the motion of the moving vehicle, and a controller which causes the display panel to display the parallax image based on the parameter indicated by the motion signal,
an optical member which reflects the image light emitted from the 3D display device and causes the reflected image light to reach the eyes of the user,
an imaging device having an imaging range containing a face of the user, and
a table provided in the controller, the table storing data indicating correspondence between acceleration of the moving vehicle in an inter-eye direction of the user and positions of eyes of the user in the inter-eye direction,
wherein, when first positions of the eyes estimated based on a captured image generated by the imaging device and second positions of the eyes estimated based on the acceleration in the inter-eye direction indicated by the motion signal are different from each other, the controller calibrates the data stored in the table by using a difference between the first positions and the second positions.

8. A program of activating a 3D display device mounted on a moving vehicle, the 3D display device comprising a display panel which displays a parallax image for a user, an optical element which defines a propagation direction of image light emitted from the display panel, an imaging device having an imaging range containing a face of the user, a communication circuitry, and a controller which includes a table storing data indicating correspondence between acceleration of the moving vehicle in an inter-eye direction of the user and positions of eyes of the user in the inter-eye direction, the program being provided in the controller and comprising:

activating the controller to cause the communication circuitry to receive a motion signal indicating a parameter of a motion of the moving vehicle, the parameter including acceleration indicating a change in the motion of the moving vehicle; and activating the controller to cause the display panel to display the parallax image based on the parameter and, when first positions of the eyes estimated based on a captured image generated by the imaging device and second positions of the eyes estimated based on the acceleration in the inter-eye direction indicated by the motion signal are different from each other, calibrate the data stored in the table by using a difference between the first positions and the second positions.

9. The 3D display device according to claim 1, wherein the parallax image includes a left-eye image and a right-eye image which has a parallax with respect to the left-eye image, the optical element is a parallax barrier including a light transmitting region and a dimming region which are alternately arranged repeatedly, and the controller causes a part of the left-eye image and right-eye image to display a black image when the positions of the eyes change toward the parallax image, the part of the left-eye image and right-eye image being viewable with both the left eye and the right eye through the light transmitting region.

* * * * *